United States Patent

Kawamoto

[11] Patent Number: 5,873,125
[45] Date of Patent: Feb. 16, 1999

[54] LOGICAL ADDRESS STRUCTURE FOR DISK MEMORIES

[75] Inventor: Masakazu Kawamoto, Kawasaki, Japan

[73] Assignee: Fujitsu Limited, Kawasaki, Japan

[21] Appl. No.: 801,206

[22] Filed: Feb. 18, 1997

Related U.S. Application Data

[63] Continuation of Ser. No. 403,227, Mar. 13, 1995, abandoned.

[30] Foreign Application Priority Data

Mar. 29, 1994 [JP] Japan .................................. 6-058586

[51] Int. Cl.$^6$ .................................................. G06F 12/08
[52] U.S. Cl. .............................. 711/202; 711/4; 711/111; 711/112; 711/170; 711/171; 711/172
[58] Field of Search ................... 711/1, 3, 4, 50, 711/112, 118, 137, 157, 170, 202, 111, 171, 172; 395/200.53; 370/255

[56] References Cited

U.S. PATENT DOCUMENTS

| | | | |
|---|---|---|---|
| 4,430,701 | 2/1984 | Christian et al. ....................... | 711/119 |
| 4,432,025 | 2/1984 | Grogan ..................................... | 360/48 |
| 4,814,903 | 3/1989 | Kulakowski et al. .................... | 360/48 |
| 5,155,835 | 10/1992 | Belsan .................................... | 711/114 |
| 5,473,761 | 12/1995 | Parks et al. ............................. | 711/4 |

FOREIGN PATENT DOCUMENTS

| | | |
|---|---|---|
| 61-227268 | 10/1986 | Japan . |
| 4125859 | 4/1992 | Japan . |
| 4351753 | 12/1992 | Japan . |
| 527913 | 2/1993 | Japan . |

*Primary Examiner*—Eddie P. Chan
*Assistant Examiner*—Than V. Nguyen
*Attorney, Agent, or Firm*—Greer, Burns, & Crain, Ltd.

[57] ABSTRACT

Logical tracks having a constant capacity are composed of combinations of physical tracks in a plurality of disks. For example, in a case where the data recording region of the first disk is divided into three zones A, B, C and that of the second disk is divided into three zones A', B', C', the physical tracks of outer zone A and inner zone C', middle zones B and B' and inner zone C and outer zone A' are combined, respectively. A host apparatus issues a read/write command by using a logical track address, and a track address converter converts the logical track address into a plurality of physical track addresses. A magnetic disk controlling apparatus writes the entire part of a record instructed to be written by the host apparatus in a physical track in one magnetic disk apparatus, or splits the record into two portions and consecutively writes them into physical tracks of both magnetic disks.

14 Claims, 21 Drawing Sheets

ZONE A : a (BYTES/TRACK)
ZONE B : b (BYTES/TRACK)
ZONE C : c (BYTES/TRACK)

$a = \frac{3}{2} b$ $c = \frac{1}{2} b$

FIG.6

| LOGICAL DEVICE ADDRESS | PHYSICAL DEVICE ADDRESS |
|---|---|
| 0 | 0 , 1 |
| 1 | 2 , 3 |
| ⋮ | ⋮ |

DTB

FIG.7

| LOGICAL TRACK | PHYSICAL TRACK |
|---|---|
| $(CCHH)_{L1}$ | $(CCHH)_{11}$ , $(CCHH)_{12}$ |
| $(CCHH)_{L2}$ | $(CCHH)_{21}$ , $(CCHH)_{22}$ |
| ⋮ | ⋮ |

TTB

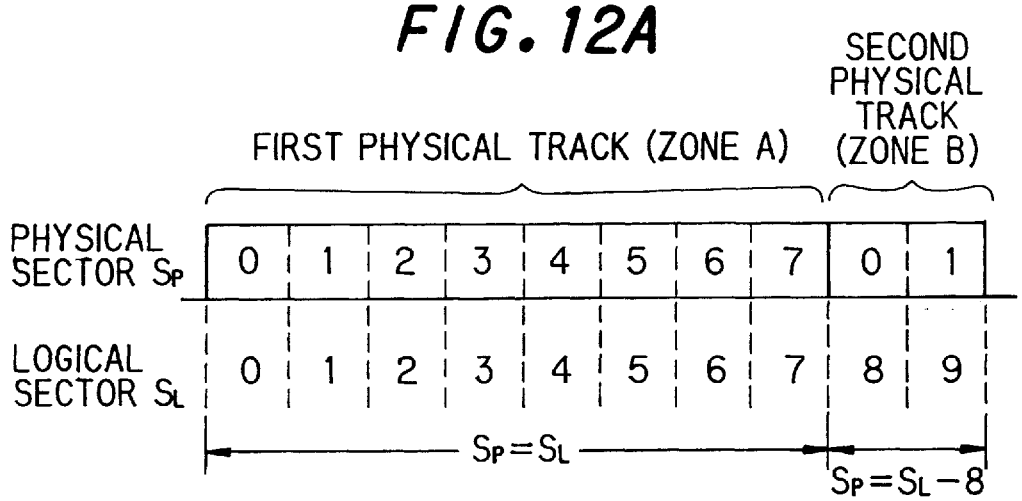
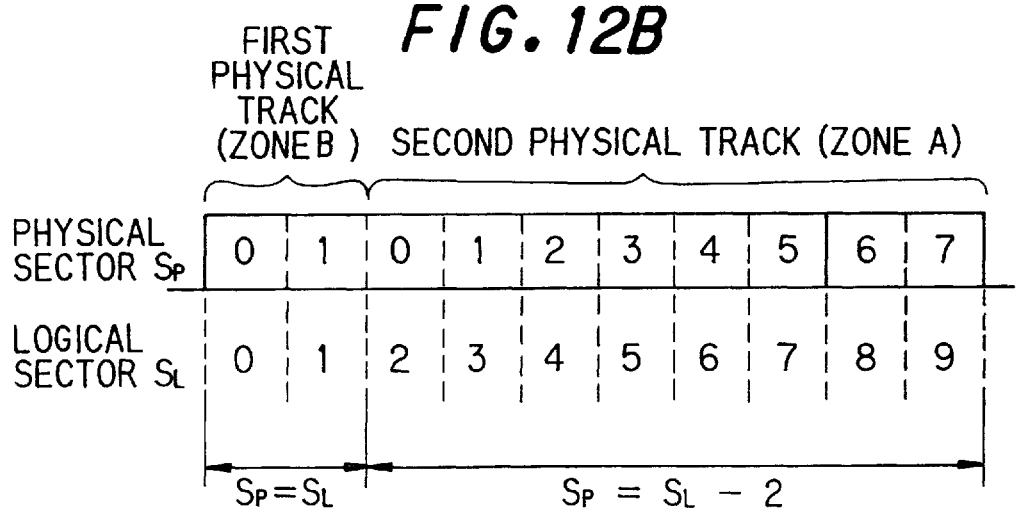

ZONE A : ——————— $a(BYTES/TRACK) = \frac{3}{2}b$ ———————

ZONE B : ——————— $b(BYTES/TRACK)$ ———————

ZONE C : ——————— $c(BYTES/TRACK) = \frac{b}{2}$ ———————

LOGICAL ADDRESS STRUCTURE FOR DISK MEMORIES

This application is a continuation of application Ser. No. 08/403,227 filed on Mar. 13, 1995, now abandoned.

BACKGROUND OF THE INVENTION

1. Field of the Invention

The present invention relates to a disk controlling method and a disk controlling apparatus and, more particularly, to a disk controlling apparatus in which a data recording region is divided in a radial direction into a plurality of zones, the recording frequency is increased in conformity to the distance of a zone from the center of the data recording region so as to make the data recording density uniform in each zone, thereby an outer zone is provided with a larger track capacity than an inner zone, and to a disk controlling method for the disk controlling apparatus.

2. Description of the Related Art

A magnetic disk subsystem is provided with a magnetic disk apparatus (DASD: Direct Access Storage Device) as an I/O device, and a disk controlling apparatus provided between a host apparatus as a higher-order apparatus and the magnetic disk apparatus so as to control the operation of writing/reading data to/from the magnetic disk apparatus.

FIG. 19 shows the structure of an I/O subsystem (magnetic disk subsystem) composed of modules for respective functions. In FIG. 19, the reference numeral 1 represents a host apparatus (CPU), 2a, 2b channel devices, 3 an I/O subsystem (magnetic disk controlling apparatus ), and 4a to 4d magnetic disk apparatuses as I/O devices. In the I/O subsystem, the reference numerals 5a, 5b represent a plurality of host interface devices (channel adapters) each serving as an interface between the I/O subsystem and a host apparatus, 6a, 6b a plurality of subordinate interface devices (device adapters) each serving as an interface between the I/O subsystem and the I/O devices 4a to 4d, 7 a resource manager for controlling the resource management as a whole and the entire processing operations, 8 a table storage portion for storing various tables which are necessary for the management of the resources, and 9 an internal bus for connecting the channel adapters 5a, 5b, the device adapters 6a, 6b and the resource manager 7 so as to enable the transmission and the reception of data between each other.

Data are written on each track of the magnetic disk apparatus in accordance with a CKD format. FIG. 20 is an explanatory view of the CKD format. Each track has areas divided by gaps, and an index mark is attached to the head of the track. The symbol HA represents a home address area subsequent to the index mark, and the address of the track is written therein. A plurality of records R0, R1, R2 . . . each of which is composed of a count area C, a key area K and a data area D are written in the area subsequent to the home address region HA. In the counter area C, a track address CCHH (CC: cylinder address, HH: head number), a record number R and the lengths $K_L$, $D_L$ of the subsequent key area and data area), etc. are written. Accordingly, by designating the track address and the record number, it is possible to designate each record. Although a key for retrieval is written in the key area K, this is not essential. User data are written in the data area D.

In the I/O subsystem having the above-described structure, data are written and read out in the following manner. In the following explanation, the I/O subsystem is assumed to be a magnetic disk controlling apparatus DCU. FIG. 21 is an explanatory view of a sequence for a data writing operation.

When a seek command SK is produced by the channel devices (CH) 2a and 2b, the magnetic disk controlling apparatus (DCU) 3 queues the command in a command queue without permitting the magnetic disk apparatuses 4a to 4d to execute a seeking operation. Thereafter, an operation end signal is supplied to the channel devices CH as if the seek operation were finished. Since a positioning time and a rotation waiting time are necessary in a magnetic disk apparatus, a plurality of positioning commands such as a seek command and a set sector command are queued up and the commands in the queue are consecutively executed when a search ID command is received, thereby increasing the processing speed.

When the channel device CH receives the seek operation end signal, it issues a set sector command SS. The magnetic disk controlling apparatus DCU queues the set sector command, and an operation end signal is supplied to the channel devices CH as if the set sector operation were finished.

When the channel device CH receives the set sector operation end signal, it issues a search ID command SID. The magnetic disk controlling apparatus DCU controls a magnetic disk apparatus DASD so as to consecutively execute seek and set sector operations and issues a retry signal so as to separate the channel device CH from the magnetic disk controlling apparatus DCU during the operation. In this manner, the channel device CH is temporarily separated from the magnetic disk controlling apparatus DCU, so that the channel device CH can execute another service or the like to another magnetic disk controlling apparatus. When the channel device CH receives a command request signal from the magnetic disk controlling apparatus DCU after the channel device CH is separated in accordance with the retry signal, the channel device CH supplies again the latest command that it has issued.

When the seek and set sector operations are finished, the magnetic disk apparatus DASD supplies an operation end signal, and in accordance with the operation end signal, the magnetic disk controlling apparatus DCU supplies a command request signal to the channel device CH. When the channel device CH receives the command request signal, the channel device CH reissues the latest command, i.e., the search ID command SID, that it has issued. When the magnetic disk controlling apparatus DCU receives the search ID command SID, the magnetic disk controlling apparatus DCU so controls the magnetic disk apparatus DASD as to execute the search ID operation, and when the search ID operation is finished, the magnetic disk apparatus DASD supplies an operation end signal to the channel device CH.

The channel device CH which has received the command request signal, it issues a write command WD. In accordance with the write command WD, the magnetic disk controlling apparatus DCU so controls the magnetic disk apparatus DASD as to execute the data write operation, and supplies a retry signal to the channel device CH so as to separate the channel device CH from the magnetic disk controlling apparatus DCU during the data writing operation. In this manner, the channel device CH is temporarily separated from the magnetic disk controlling apparatus DCU.

When the data write operation is finished, the magnetic disk apparatus DASD supplies a data write operation end signal to the magnetic disk controlling apparatus DCU, and in accordance with the operation end signal, the magnetic disk controlling apparatus DCU supplies a command request signal to the channel device CH. When the channel device CH receives the command request signal, the channel device CH reissues the latest command, i.e., the write command WD, that it has issued. When the magnetic disk controlling apparatus DCU receives the write command WD, the magnetic disk controlling apparatus DCU immediately transfers the write operation end signal to the channel device CH, thereby completing a series of writing operations.

The internal operations in the magnetic disk controlling apparatus in the above-described data writing operations are, for example, as follows. When a seek command SK is produced by the channel device 2a, the channel adapter 5a queues the command in a command queue and thereafter returns an operation end signal to the channel devices 2a as if the seek operation were finished. When the channel device 2a receives the seek operation end signal, it issues a set sector command SS. When the channel adapter 5a receives the set sector command SS, it queues the command in a command queue and thereafter returns an operation end signal to the channel devices 2a as if the set sector operation were finished. When the channel device 2a receives the set sector operation end signal, it issues a search ID command SID. The channel adapter 5a which has received this command informs the resource manager 7 of the reception of the command, and issues a retry signal so as to separate the channel device 2a from the magnetic disk controlling apparatus 3. The resource manager 7 confirms that the magnetic disk apparatus 4a as an object (which is designated by a start I/O command) is not being accessed by referring to an exclusive control table stored in the table storage portion 8, determines a predetermined device adapter 6a and supplies the identification data for the device adapter 6a to the channel adapter 5a. The resource manager 7 supplies the identification data for the channel adapter 5a to the device adapter 6a. The resource manger 7 also writes in the exclusive control table that the magnetic disk apparatus 4a is being accessed.

The channel adapter 5a supplies the CKD track position (CCHH) contained in the seek command to the designated device adapter 6a and requests it to execute seek operation. When the device adapter 6a receives the request of the seek operation, it instructs the magnetic disk apparatus 4a to execute a seek operation. When the device adapter 6a receives a positioning end signal from the magnetic disk apparatus 4a after completion of the seek operation, the device adapter 6a reports the reception of the positioning end signal to the channel adapter 5a. The channel adapter 5a then supplies the sector value which is contained in the set sector command to the device adapter 6a and requests the device adapter 6 to execute a set sector operation.

Similar processing is executed between the channel adapter 5a and the device adapter 6a, and when the reading/writing operation to the magnetic disk apparatus 5a is finally finished, the channel adapter 5a reports the end of access to the resource manager 7. When the resource manager 7 receives the report of the end of access, it writes in the exclusive control table that the magnetic disk apparatus as the object is not being accessed.

FIG. 22 is an explanatory view of a sequence for a data reading operation. It is the same as FIG. 22 except that a read command RD takes the place of a write command WD.

In a small-size magnetic disk apparatus, the number of revolutions is increased and the amount of floating in the head is reduced for the purpose of high-density recording. However, with a reduction in disk size, the difference in the length between an inner track and an outer track is enlarged. Especially, when the innermost track is brought closer to the center of the disk in order to increase the recording density per disk, the outermost track becomes more than twice as long as the innermost track. As a result, in an outer periphery, the linear speed is high and the bit linear density (recording density) is low, and the closer to the center of the disk, the lower the linear speed and the higher the bit linear density. In other words, the recording density in an inner track is greatly different from that in an outermost track.

To prevent this, a constant density recording (CDR) system is proposed. In this CDR system, a data recording region of a disk DK is divided in a radial direction into a plurality of zones (three zones A, B and C in FIG. 23), as shown in FIG. 23, and the recording frequency is increased in conformity to the distance of a zone from the center of the disk DK so as to make the data recording density nearly uniform in each zone. According to this system, it is possible to limit the recording density in each zone to a predetermined range, and high-density recording is possible all over the disk surface.

In the CDR system, however, the capacity per track (bytes/track) (hereinafter referred to as "track capacity") is different between zones, as shown in FIG. 24. For example, if the capacity (bytes/track) of the zones A, B and C are assumed to a, b and c, respectively, the track capacity in the zone A is 1.5 times of the track capacity in the zone B, and the track capacity in the zone C is ½ of the track capacity in the zone B. In a variable-length recording system adopting a conventional CKD format, the software of a host apparatus is produced on the assumption that the track capacity is uniform. For this reason, it is impossible to apply conventional software resources to a disk of a CDR system having different track capacities, which necessitates the trouble of newly producing software from the beginning.

In order to forcibly apply a conventional variable-length recording method to a CDR disk, the disk must be used on the assumption that it has the track capacity of the innermost track. Thus, the efficiency of the disk is greatly lowered, which makes the CDR system adopted for high-density recording meaningless.

SUMMARY OF THE INVENTION

Accordingly, it is a first object of the present invention to eliminate the above-described problems in the related art and to provide a disk controlling method and a disk controlling apparatus which enable a variable-length recording system based on a conventional CKD format to be applied to a CDR disk apparatus.

It is another object of the present invention to provide a disk controlling method and a disk controlling apparatus which do not lower the efficiency of the disk even if a variable-length recording system based on a conventional CKD format is applied to a CDR disk apparatus.

It is still another object of the present invention to provide a disk controlling method and a disk controlling apparatus which enable conventional software resources to be applied to a CDR disk apparatus.

To achieve these objects, in a first aspect of the present invention, there is provided a disk controlling method for a disk controlling apparatus in which a data recording region of a disk is divided in a radial direction into a plurality of zones and the recording frequency is increased in conformity to the distance of a zone from the center of the data recording region so as to limit the data recording density in each zone to a predetermined range, thereby an outer zone is provided with a larger track capacity than an inner zone, comprising steps of producing one logical track by combining a plurality of physical tracks; converting a logical track address input from a host apparatus at the time of access into a plurality of physical track addresses; and accessing the disk on the basis of the physical track addresses obtained by the conversion.

In a second aspect of the present invention, there is provided a disk controlling apparatus in which a data recording region is divided in a radial direction into a plurality of zones and the recording frequency is increased in conformity to the distance of a zone from the center of the data recording region so as to limit the data recording density in each zone to a predetermined range, thereby an outer zone is provided with a larger track capacity than an inner zone, the apparatus comprising: a device address converting means for converting a logical device address which is input from a host apparatus into a plurality of physical device addresses in a case where one logical device is produced by combining a plurality of disk apparatuses as physical devices; a track address converting means for converting a logical track address input from the host apparatus into a plurality of physical track addresses in a case where one logical track is produced by combining physical tracks of the disk apparatuses which constitute the logical device; and a control means for controlling the disk apparatuses so that the physical tracks obtained by the conversion are accessed.

Other features and advantages of the present invention will be apparent from the following description taken in conjunction with the accompanying drawings.

BRIEF DESCRIPTION OF THE DRAWINGS

FIG. 6 is an explanatory view of a device table;

FIG. 7 is an explanatory view of a track table;

FIGS. 12A and 12B are explanatory views of the relationship between a logical sector and a physical sector;

DESCRIPTION OF THE PREFERRED EMBODIMENTS (A) Scheme of the present invention

Figure 1:
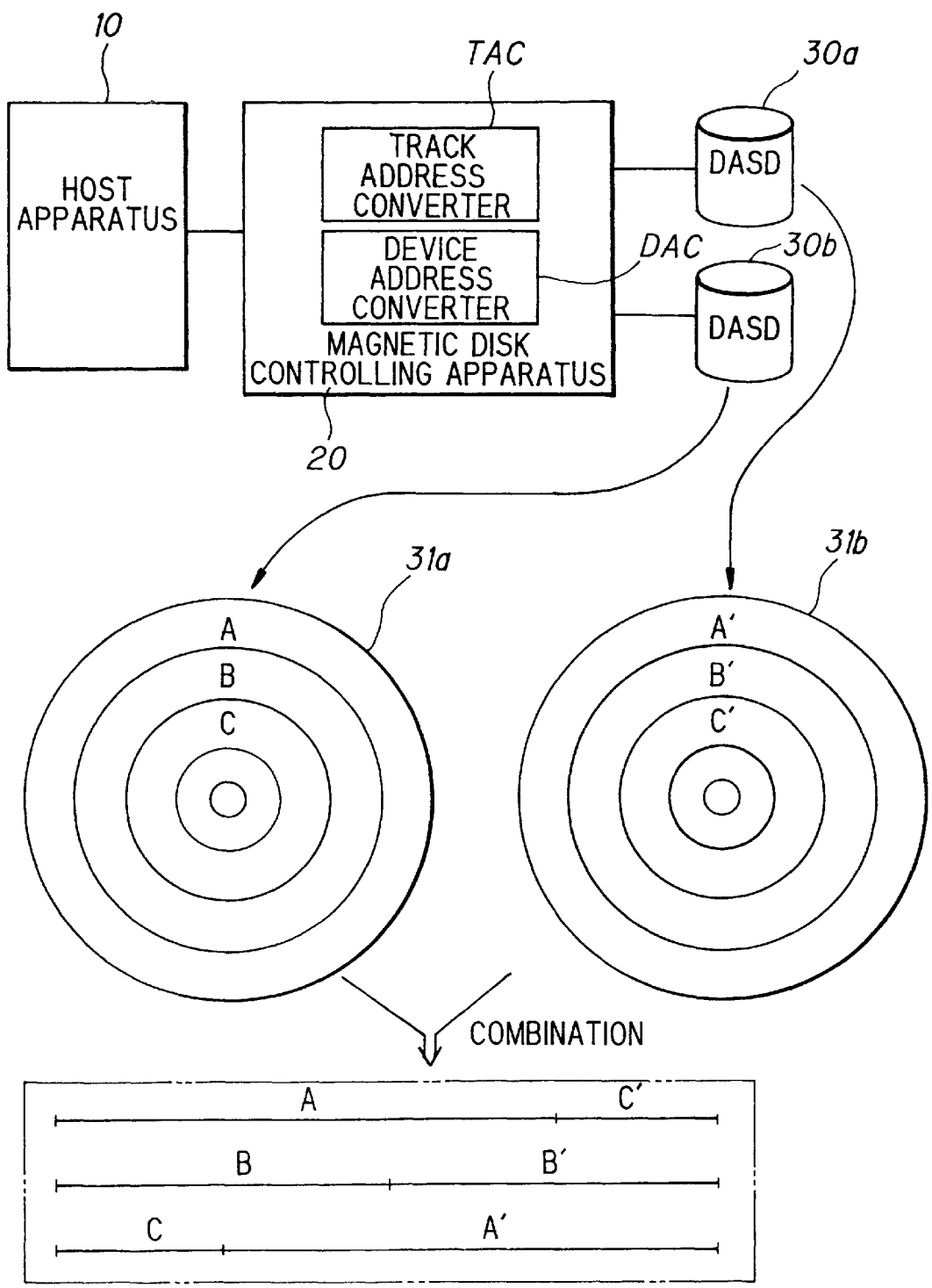
FIG. 1 is an explanatory view of the principle of the present invention.

FIG. 1 schematically explains the principle of the present invention.

The reference numeral 10 denotes a CPU as a host apparatus, 20 a magnetic disk controlling apparatus, and 30a, 30b magnetic disk apparatuses (DASD). The symbol TAC denotes a track address converter for converting a logical track address into physical track addresses, and DAC a device address converter for converting a logical device address into physical device addresses. The reference numerals 31a and 31b represent magnetic disks in the magnetic disk apparatuses (DASD) 30a, 30b. Each of the magnetic disks 31a, 31b is divided in a radial direction into a plurality of zones (three zones A, B and C: three zones A', B' and C' in FIG. 1), and data are recorded at substantially the same density in accordance with a CDR system. It is assumed that the capacity of the zones A, A', the capacity of the zones B, B' and the capacity of the zones C, C' are a (bytes/track), b (bytes/track) and c (bytes/track), respectively, that the track capacity of the zones A, A' is 1.5 times of the track capacity of the zones B, B' and that the track capacity of the zones C, C' is ½ of the track capacity of the zones B, B'.

The physical tracks in the plurality of magnetic disks 31a, 31b are combined so as to produce logical tracks each of which has a constant or substantially constant capacity. For example, the physical tracks of the zones A and C', the physical tracks of the zones B and B' and the physical tracks of the zones C and A' are combined respectively. By these combinations, each of the logical tracks has a constant capacity 2·b. The host apparatus 10 issues a read/write command (e.g., seek command) by using a logical track address. The track address converter TAC converts the logical track address input from the host apparatus into a plurality of physical track addresses. The magnetic disk controlling apparatus 20 writes all of the data which are instructed to be written by the host apparatus 10 into the physical track of only one magnetic disk. Alternatively, the magnetic disk controlling apparatus 20 may split the data and write the split data consecutively into the physical tracks of each magnetic disk. When the host apparatus 10 instructs the magnetic disk controlling apparatus 20 to read data, the magnetic disk controlling apparatus 20 reads the data from the physical track of only one magnetic disk or consecutively from the physical tracks of both magnetic disks and transfers the read data to the host apparatus 10. In this manner, since every logical track having the same length is composed of a plurality of physical tracks and the host apparatus issues a read/write command by using a logical track address, it is possible to apply a variable-length recording system based on a conventional CKD format as it is to a CDR disk apparatus. In addition, the host apparatus can utilize conventional software resources as they are.

In the case of producing a logical track by combining physical tracks of the plurality of magnetic disk apparatuses 30a, 30b, the correspondence of a logical device address with physical device addresses in these magnetic disk apparatuses 30a, 30b is stored in advance in the magnetic disk controlling apparatus 20. When the host apparatus 10 designates a logical device address, the device address converter DAC obtains the corresponding physical device addresses from this correspondence. When the host apparatus 10 designates a logical track address, the track address converter TAC converts the logical track address into a plurality of physical track addresses in the magnetic disks 30a, 30b in correspondence with the physical device addresses obtained.

According to this structure, it is possible to produce a logical track by combining physical tracks in different magnetic disk apparatuses. In addition, since a logical device is composed of the magnetic disk apparatuses to which the physical tracks constituting a logical track belong, it is possible to equalize the number of heads and the number of cylinders of the logical device to the number of heads and the number of cylinders of each magnetic disk apparatus.

In the case of producing a logical track by combining physical tracks in different magnetic disk apparatuses, if each magnetic disk apparatus is so controlled that the spindle motor rotates synchronously, it is possible to record data into two physical tracks or consecutively read the data from two physical tracks.

(B) Embodiment (a) Structure of an embodiment of the present invention

Figure 2:
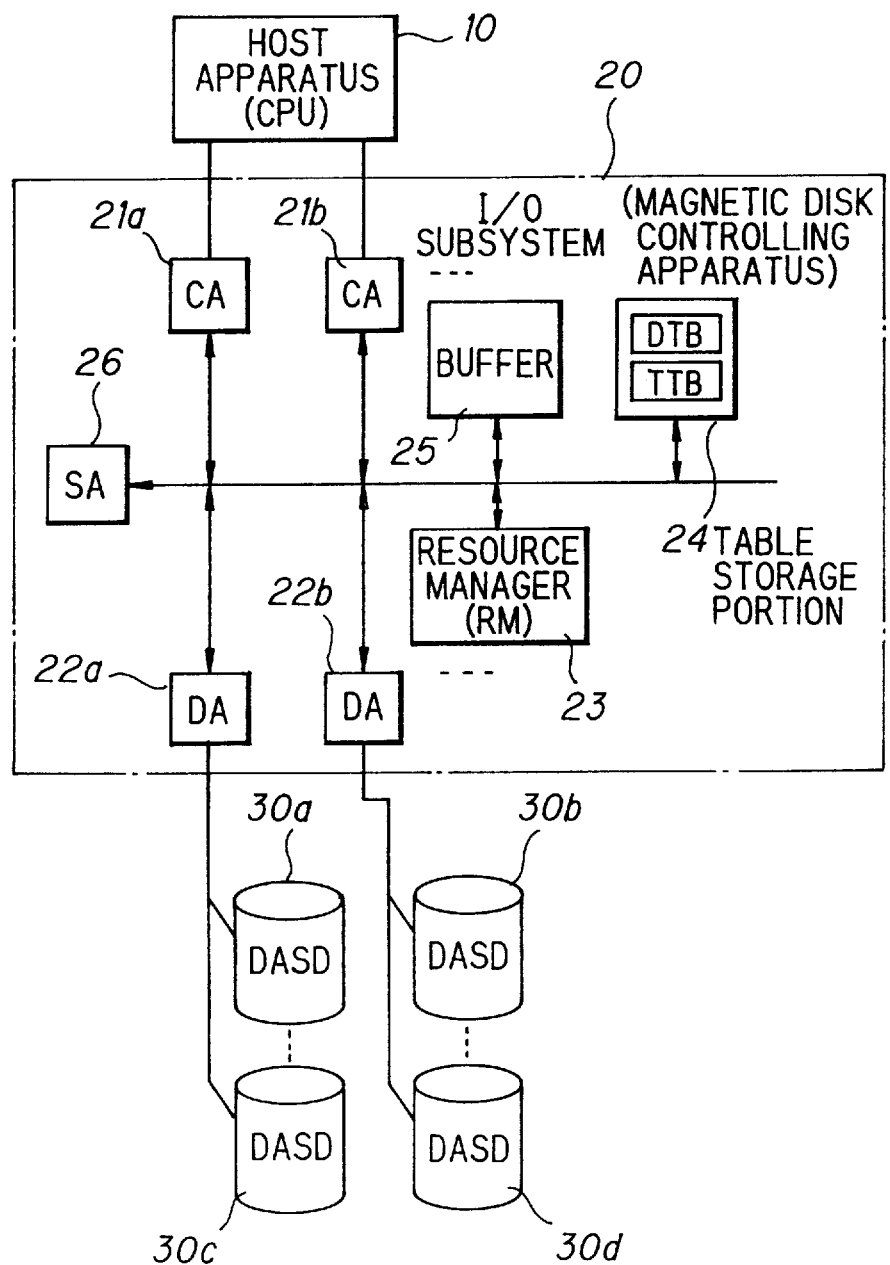
FIG. 2 shows the structure of an embodiment of the present invention.

FIG. 2 shows the structure of the present invention. In FIG. 2, the reference numeral 10 represents a CPU as a host apparatus, 20 a magnetic disk controlling apparatus as an I/O subsystem, and 30a to 30d magnetic disk apparatuses (DASD) as I/O devices. In the magnetic disk controlling apparatus 20, the reference numerals 21a, 21b . . . channel adapters (CA) each serving as an interface between the host apparatus 10 and the magnetic disk controlling apparatus 20, 22a, 22b, . . . device adapters (DA) each serving as an interface between the magnetic disk controlling apparatus 20 and the magnetic disk apparatuses 30a to 30d, 23 a resource manager (RM) for controlling the resource management as a whole and the entire processing operations, 24 a table storage portion (TS) for storing various tables, 25 a buffer memory, and 26 a service adapter (SA) for detecting a trouble caused in one of the units which are connected to each other by a bus.

(b) Magnetic disk apparatus

Figure 3:
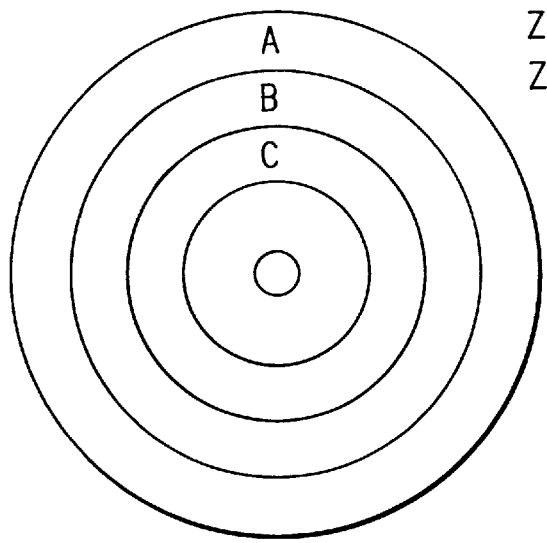
FIG. 3 is an explanatory view of zone division.

Each of magnetic disks accommodated in the magnetic disk apparatuses 30a to 30d is divided in a radial direction into a plurality of zones (three zones A, B and C in FIG. 3), as shown in FIG. 3, and data are recorded at substantially the same density (in a predetermined range) in accordance with a CDR system. It is assumed that the capacities of the zones A, B and C are a (bytes/track), b (bytes/track) and c (bytes/track), respectively, that the track capacity of the zone A is 1.5 times (a=3b/2) of the track capacity of the zone B, and that the track capacity of the zone C is ½ (c=b/2) of the track capacity of the zone B.

In the present invention, each of logical tracks which have a substantially constant capacity is composed by combining physical tracks in n magnetic disks (n is, for example, 2). A logical track is the track which is designated by the track address contained in a command (e.g., seek command) which is issued from the host apparatus 10, and the track address contained in such a command is defined as a "logical track address".

Figure 4:
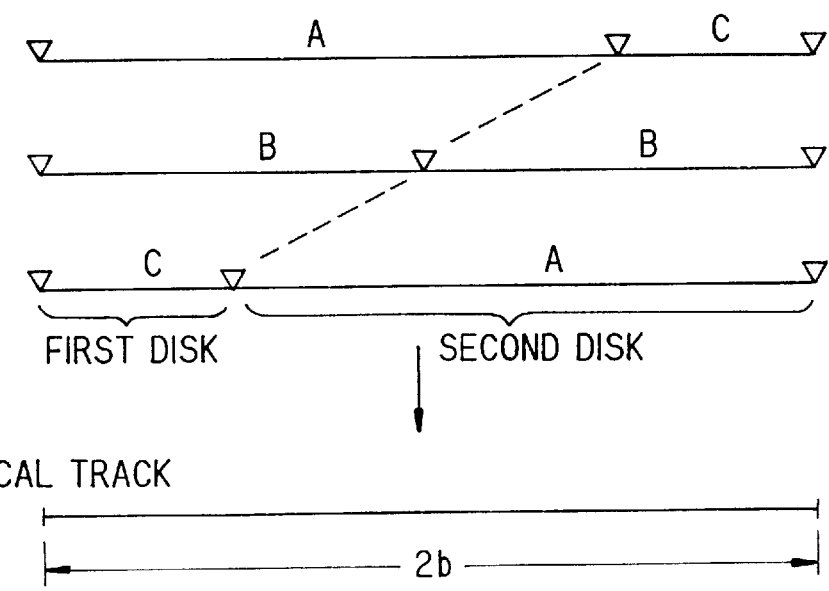
FIG. 4 is an explanatory view of the structure of logical tracks.

In FIG. 4, logical tracks are composed by a combination of the zone A of a first disk and the zone C of a second disk, a combination of the zone B of the first disk and the zone B of the second disk, and a combination of the zone C of the first disk and the zone A of the second disk. By these combinations, each of the logical tracks has a constant capacity 2·b. The n (=2) disks constituting a logical track may belong to one magnetic disk apparatus. Alternatively, one disk from each of n magnetic disk apparatuses may be used.

Figure 5:
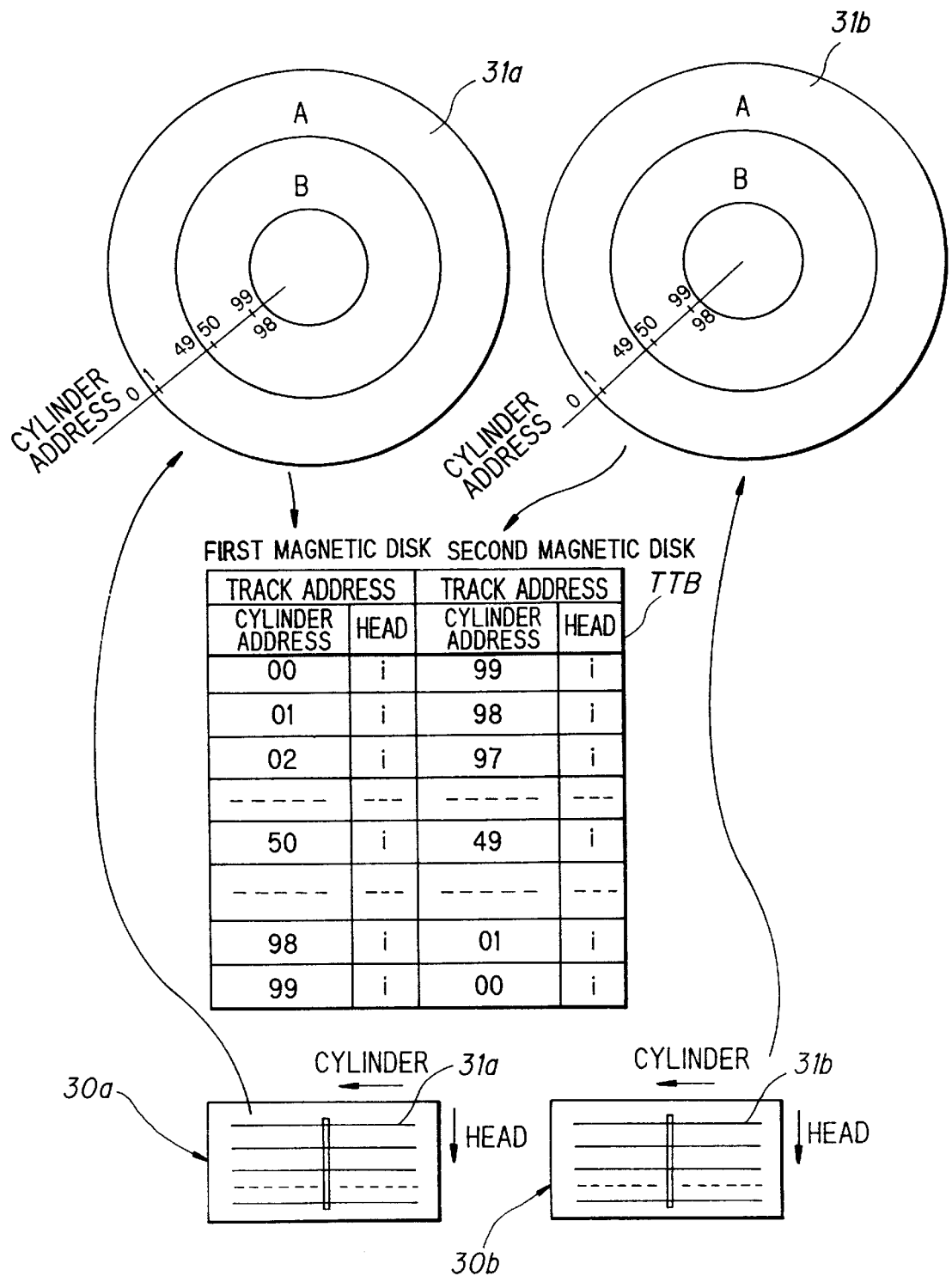
FIG. 5 is an explanatory view of production of a logical track by combining one physical track in each of the two magnetic disk apparatuses.

FIG. 5 is an explanatory view of production of a logical track by combining one physical track in each of the two magnetic disk apparatuses.

The magnetic disks 31a, 31b of the magnetic disk apparatuses 30a, 30b have the same head address (same head number) i and each disk is divided into two zones A and B. Physical tracks constituting logical tracks are combined as follows:

(1) A first logical track is composed of a combination of the outermost track of the first disk 31a and the innermost track of the second disk 31b. That is, the track address (00, i) of the first disk 31a is combined with the track address (99, i) of the second disk 31b to produce a first logical track. Similarly, (2) the track address (01, i) of the first disk 31a is combined with the track address (98, i) of the second disk 31b, (3) the track address (02, i) of the first disk 31a is combined with the track address (97, i) of the second disk 31b, . . . and (4) the track address (j, i) of the first disk 31a is combined with the track address (Tc-j-1, i) of the second disk 31b, wherein Tc is the total number of cylinders, for example, 100, and j=0 to 99.

The correspondence between the track address of the first magnetic disk 31a with the track address of the second magnetic disk 31b which constitute a logical track is shown in the table TTB in FIG. 5.

(c) Table storage portion

In the case of producing logical tracks by combining tracks in a plurality of magnetic disk apparatuses (physical devices), these plurality of physical devices constitute one logical device. A table DTB showing the correspondence of a logical device with physical devices is stored in the table storage portion 24 in FIG. 2. A logical device is the device which is designated by the device address contained in a command (e.g., start I/O command) which is issued from the host apparatus 10, and the device address contained in such a command is defined as a "logical device address".

The table TTB which shows the correspondence between a logical track and the physical tracks which constitute the logical track is stored in the table storage portion 24.

FIG. 6 is an explanatory view of the table DTB which shows the correspondence of a logical device with physical devices. The logical device address 0 corresponds to the physical device addresses 0, 1, the logical device address 1 corresponds to the physical device addresses 2, 3, and so forth.

FIG. 7 is an explanatory view of the table TTB which shows the correspondence between a logical track address and the physical track addresses. The logical track address $[CCHH]_{L1}$ corresponds to the physical track addresses $[CCHH]_{11}$, $[CCHH]_{12}$, the logical track address $[CCHH]_{L2}$ corresponds to the physical track addresses $[CCHH]_{21}$, $[CCHH]_{22}$, and so forth.

By using these tables, it is possible to convert a logical device address into a plurality of physical device addresses, and to convert a logical track address into a plurality of physical track addresses.

In the above explanation, physical devices and physical tracks are obtained by using the tables. If it is possible to obtain physical device addresses from a logical device address by calculation, or physical track addresses from a logical track address by calculation, physical device addresses and physical track addresses may be obtained by using software. For example, in the example shown in FIG. 6, if it is assumed that the logical device address is DL and the physical device addresses are DP1 and DP2, the physical device addresses are obtained from the following formula:

$$DP1=2 \cdot DL, \; DP2=2 \cdot DL+1.$$

In FIG. 7, if it is assumed that a logical track address is $CC_L HH_L$, and two physical track addresses are $CC_{p1} HH_{p1}$, and $CC_{p2} HH_{p2}$, the physical track addresses $CC_{p1} HH_{p1}$ and $CC_{p2} HH_{p2}$ are obtained from the following formulas:

$$CC_{p1}=CC_L, \; HH_{p1}=HH_L,$$

$$CC_{p2}=(Tc-CC_L), \; HH_{p2}=HH_L,$$

wherein Tc is the total number of cylinders of the disk and it is assumed that the logical track address is coincident with a first physical track address.

(d) Summary of data writing/reading control

Figure 8A:
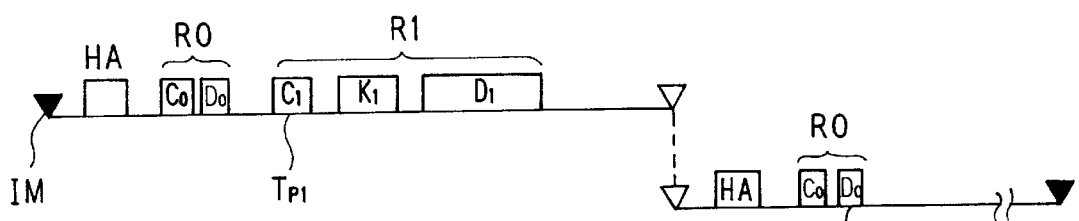
FIGS. 8A, 8B and 8C are explanatory views of data writing/reading control.
Figure 8B:
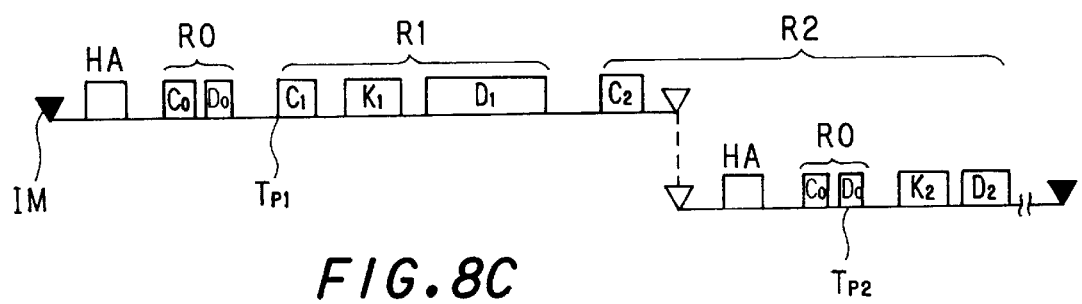
Figure 8C:
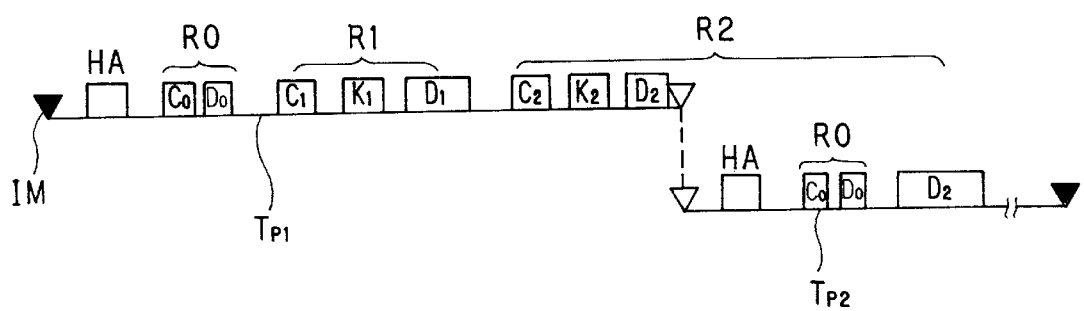

FIGS. 8A to 8C schematically explain data writing control in the case in which a logical track is composed of two physical tracks. It is assumed that home address information HA and a record R0 after a track head (index mark IM) are recorded in advance in each track in accordance with a CKD format.

As shown in FIG. 8A, a record R1 is recorded in a first physical track $T_{p1}$ in a variable-length recording system based on a CKD format. In this state, in the case of recording a record R2 after the record R1, it is judged whether or not there is a space for recording the record R2 in the first physical track $T_{p1}$, and if the answer is in the affirmative, the record R2 is written in the first physical track $T_{p1}$. However, if there is not a sufficient space for recording the record R2 in the first physical track $T_{p1}$, the remaining portion of the record R2 which is not written in the first physical track $T_{p1}$ is written in a second physical track $T_{p2}$ (after the record R0), as shown in FIG. 8B. That is, a count portion C2 of the record R2 is written in the first physical track $T_{p1}$, and a key portion K2 and a data portion D2 of the record R2 are written in the second physical track $T_{p2}$.

FIG. 8B shows the case in which the record R2 is split into two portions at the end of the count portion C2 and the beginning of the key portion K2, and the former portion and the latter portion are written into the first and second physical tracks, respectively. However, there is a case in which the record R2 is split into two portions in the middle of the data portion D2, as shown in FIG. 8C, or in the middle of the key portion K2.

When a record is read, judgement is made as to whether or not the whole part of the record as the object exists in the first physical track, and if the answer is in the affirmative, the record is read from the first physical track. However, if the answer is in the negative, the record as the object is read from the first and second physical tracks.

(e) Magnetic disk apparatus

Figure 9:
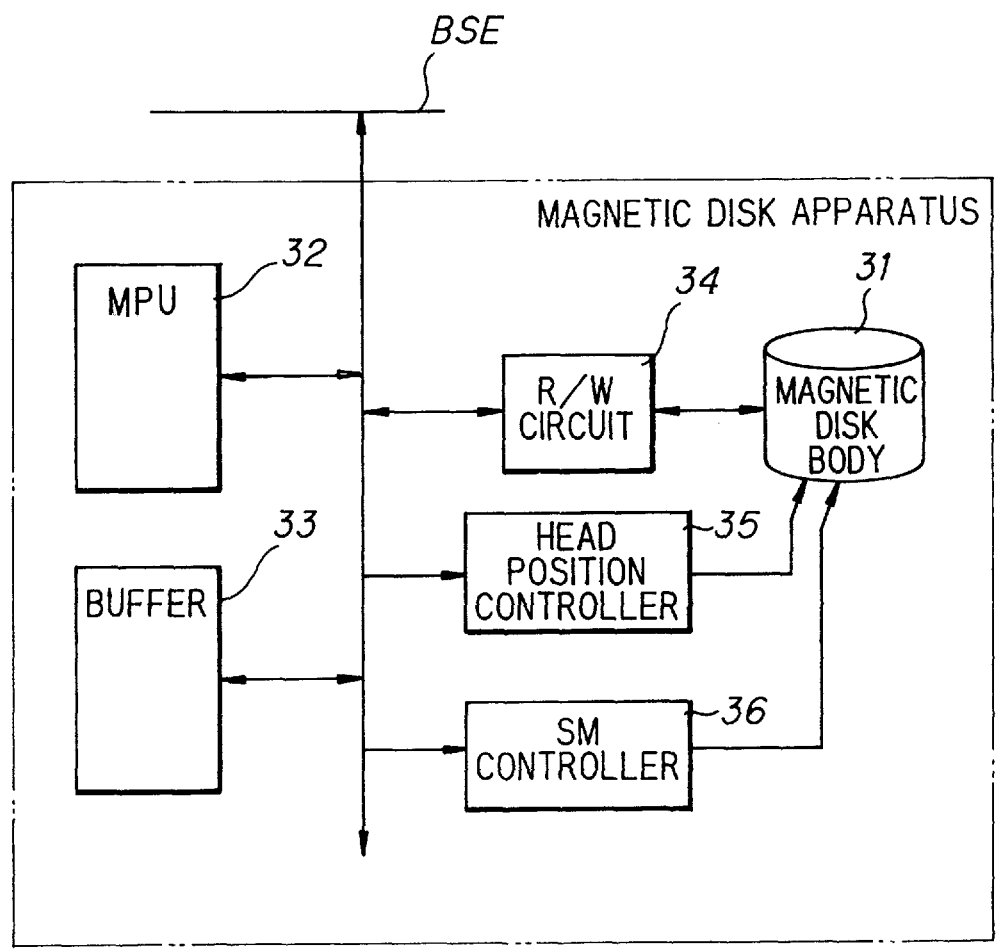
FIG. 9 shows the structure of a magnetic disk apparatus.

FIG. 9 shows the structure of the magnetic disk apparatuses 30a to 30d. The reference numeral 31 represents the main body of a magnetic disk which accommodates n number of magnetic disks, n number of heads, a positioning mechanism for positioning each head at a predetermined cylinder position, a spindle motor, etc. The reference numeral 32 denotes a microprocessor unit (MPU), which not only supplies and receives data to and from the device adapter via an external bus BSE but also controls the magnetic disk apparatus as a whole. The reference numeral 33 denotes a buffer for temporarily storing the data transferred from the device adapter at the time of writing or the data read from the magnetic disk at the time of reading. The reference numeral 34 represents a data writing/reading circuit (RIW circuit) which can write data while switching the writing frequency for each zone in accordance with the instruction from the MPU 32. The reference numeral 35 represents a head position controller for positioning a predetermined head at a predetermined position, and 36 a spindle motor controller for rotating the spindle motor at a constant rate or in synchronism with the spindle motor of another magnetic disk apparatus.

(f) Spindle rotation synchronization mechanism

In the case of producing one logical track from each track in a plurality of magnetic disk apparatuses, it is sometimes necessary to write or read a record into or from a plurality of physical tracks, as explained in FIGS. 8(A) to 8(C). In the case of writing a record into a plurality of physical tracks, the record is first written in a first physical track to the end thereof and the remaining portion of the record is then written in a second physical track from the head thereof (actually after the record R0). In the case of reading a record from a plurality of physical tracks, the record is first read from a first physical track to the end thereof and the remaining portion of the record is then read from a second physical track from the head thereof (actually after the record R0).

In the case of writing or reading a record into or from a plurality of physical tracks as described above, if it is possible to write or read the remaining portion of a record into or from the second physical track immediately after the first portion is written or read into or from the first physical track, high-speed access is enabled. In order to enable high-speed access, it is necessary to rotate the spindle motor of each magnetic disk apparatus synchronously.

Figure 10:
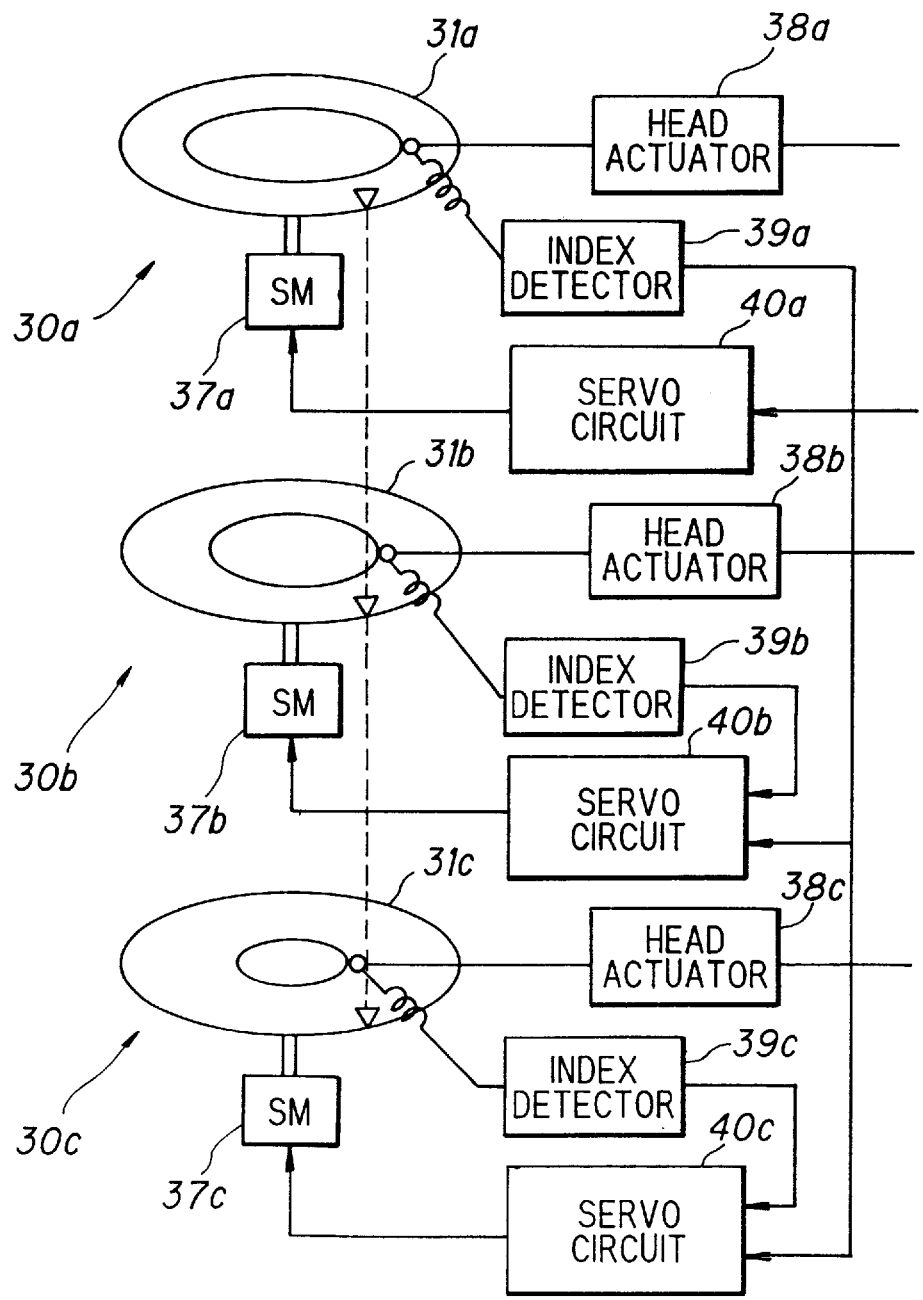
FIG. 10 shows the structure of a spindle rotation synchronization mechanism.

FIG. 10 shows the structure of a spindle rotation synchronization mechanism for rotating the spindle motor of each magnetic disk apparatus synchronously. In FIG. 10, the spindle motors of three magnetic disk apparatuses are rotated in synchronism with each other.

The reference numerals 30a to 30c represent magnetic disk apparatuses, 31a to 31c magnetic disks of the respective magnetic disk apparatuses 30a to 30c (only one magnetic disk is shown for each magnetic disk apparatus), 37a to 37c spindle motors, 38a to 38c head actuators for moving heads to predetermined cylinder positions, 39a to 39c index mark detectors for detecting the index marks at the heads of the tracks, and 40a to 40c servo circuits.

The servo circuit 40a so controls the spindle motor 37a as to rotate at a designated rate. Each of the servo circuits 40b and 40c generates a voltage which corresponds to the time difference (phase difference) between the point of time when the index mark of the magnetic disk apparatus 30b (30c) is detected and the point of time when the index mark of the magnetic disk apparatus 30a as the master is detected, and so controls the rotational rate of the spindle motor 37b (37c) that the difference becomes zero.

(g) Writing process

Figure 11:
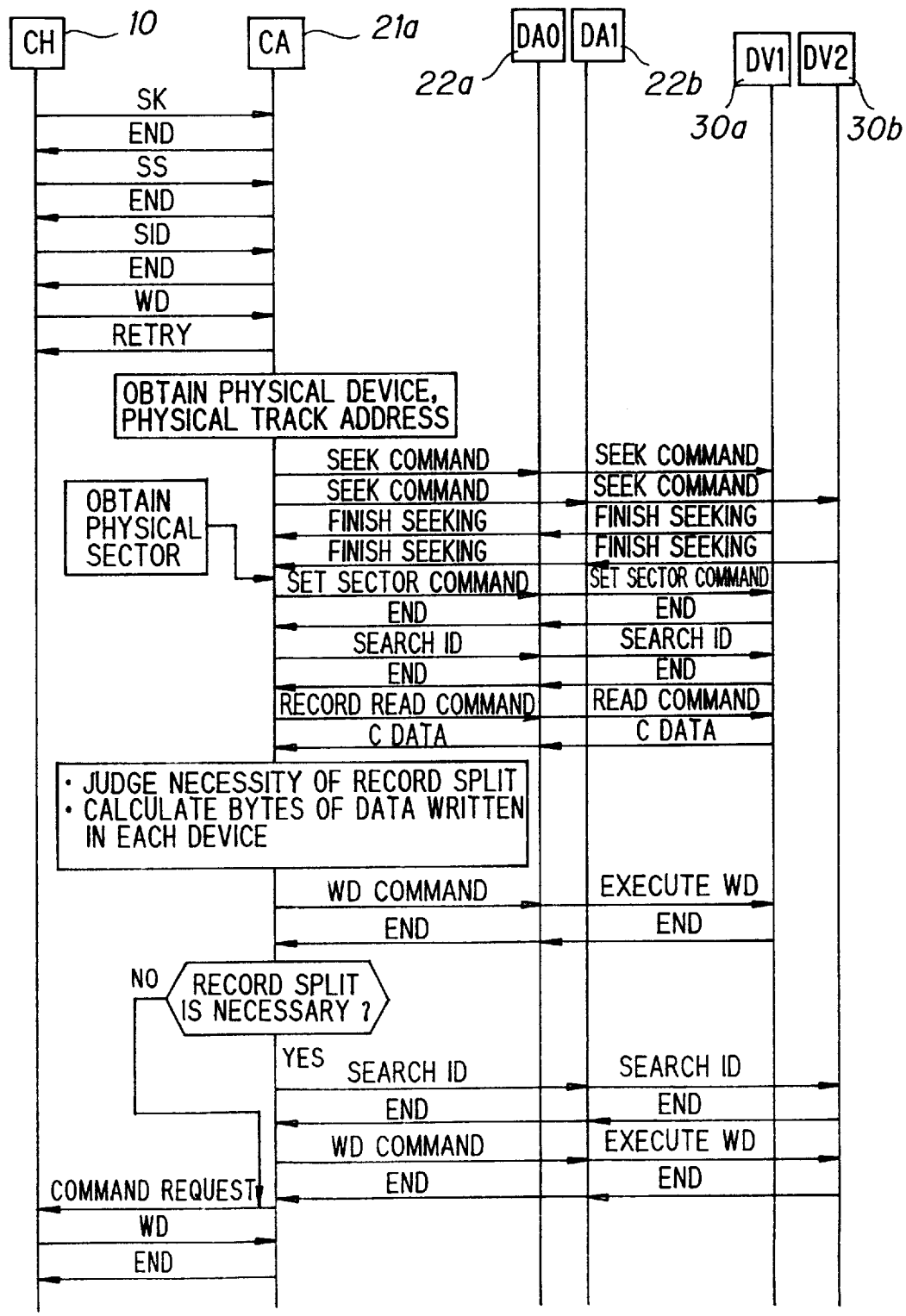
FIG. 11 is an explanatory view of a writing process.

FIG. 11 is an explanatory view of a writing process. It is assumed that a logical track is composed of physical tracks in two magnetic disk apparatuses, and that a magnetic disk in each magnetic disk apparatus is divided into two zones A and B, as shown in FIG. 5.

When a start I/O command is input from the host apparatus (channel device CH), the channel adapter (CA) 21a writes the logical device address contained in the start I/O command into the buffer 25 (FIG. 2).

When a seek command SK is next input from the channel device (CH) 10, the channel adapter 21a queues the command in a command queue in the buffer 25 without permitting the magnetic disk apparatuses to execute a seek operation. Thereafter, an operation end signal is supplied to the channel device 10 as if the seek operation were finished. When the channel device 10 receives the seek operation end signal, it issues a set sector command SS. When the channel adapter 21a receives the set sector command SS, it queues the command in the command queue and thereafter returns an operation end signal to the channel devices 10 as if the set sector operation were finished. Similarly, the channel adapter 21a receives a search ID command SID and a write command WD, queues these commands in the command queue and stores data to be written into the buffer 25.

After queuing the write command WD, the channel adapter 21a issues a retry signal so as to separate the channel device 10 from the magnetic disk controlling apparatus 20. In this manner, the channel device 10 is temporarily separated from the magnetic disk controlling apparatus 20, so that the channel device 10 can execute another service or the like to another magnetic disk controlling apparatus.

The channel adapter 21a converts the logical device address contained in the start I/O command into physical device addresses by referring to the table DTB, and writes the physical device addresses into the buffer 25. By these physical device addresses, identified are the magnetic disk apparatuses (magnetic disk apparatuses 30a, 30b) to which the physical tracks constituting the logical track specified by the logical track address contained in the seek command SK belong.

The channel adapter 21a further converts the logical track address contained in the seek command SK into physical track addresses by referring to the table TTB, and writes the physical track addresses into the buffer 25. The physical device addresses and the physical track addresses may be obtained by calculation.

The channel adapter 21a then informs the resource manager 23 of the physical device addresses. The resource manager 23 confirms that the magnetic disk apparatuses 30a and 30b identified by the physical device addresses are not being accessed by referring to an exclusive control table (not shown) stored in the table storage portion 24, determines predetermined device adapters 22a, 22b, and supplies their device adapter identification data to the channel adapter 21a. The resource manager 23 supplies the channel adapter identification data of the channel adapter 21a to the device adapters 22a, 22b. The resource manager 23 also writes into the exclusive control table that the magnetic disk apparatuses 30a and 30b are being accessed.

The channel adapter 21a supplies the respective physical track addresses obtained to the device adapters 22a and 22b designated by the resource manager 23 and requests the device adapters 22a, 22b to execute the seek operation. When the device adapters 22a, 22b receive the request of the seek operation, they instruct the magnetic disk apparatuses 30a, 30b to execute a seek operation respectively. When the device adapters 22a, 22b receive a positioning end signal from the magnetic disk apparatuses 30a, 30b after completion of the seek operation, the device adapters 22a, 22b report the reception of the positioning end signal to the channel adapter 21a.

The channel adapter 21a then converts the logical sector value $S_L$ which are contained in the set sector command to a physical sector value $S_P$ in the physical track in which the logical sector exists. The sector value conversion process will be explained later with reference to FIGS. 12 and 13.

The channel adapter 21a then supplies the physical sector value $S_L$ obtained to the device adapter corresponding to the magnetic disk apparatus whose disk includes the physical track in which the logical sector exists and requests the device adapter to execute set sector operation. In FIG. 11, since the physical sector value S of the first physical track is obtained, the channel adapter 21a supplies the physical sector value $S_P$ obtained to the device adapter 22a and requests the device adapter 22a to execute the set sector operation.

The device adapter 22a then instructs the magnetic disk apparatus 30a to execute a set sector operation. When the set sector operation is finished, the magnetic disk apparatus 30a supplies an operation end signal to the device adapter 22a, and the device adapter 22a in turn reports the end of the set sector operation to the channel adapter 21a.

When the set sector operation is finished, the channel adapter 21a requests the device adapter 22a so as to instruct the magnetic disk apparatus 30a to execute a search ID operation. When the search ID operation is finished, the channel adapter 21a instructs the device adapter 22a to read the record searched by the search operation. The searched record is a record immediately before the record as the object of writing. The device adapter 22a instructs the magnetic disk apparatus 30a to read the record and supplies the read data on the count portion C to the channel device 21a.

The channel adapter 21a judges whether or not the record designated from the host apparatus 10 is to be split and written into the first and second physical tracks. If it is necessary to split the record (record split), the channel adapter 21a calculates the bytes of the former portion and the latter portion of the record which are written in the first physical track and the second physical track, respectively. This process will be described later with reference to FIGS. 14 and 15.

The channel adapter 21a then instructs the device adapter 22a to write the record. In this case, if it is not necessary to split the record, the channel adapter 21a instructs the device adapter 22a to write the entire part of the record, while if record split is necessary, the channel adapter 21a instructs the device adapter 22a to write the former part of the record.

The device adapter 22a instructs the magnetic disk apparatus 30a to write the designated data, and when the writing operation is finished, the device adapter 22a reports the end of the writing operation to the channel adapter 21a. The channel adapter 21a judges whether or not record split is necessary, and if the answer is in the negative, the channel adapter 21a supplies a command request signal to the channel device 10. When the channel device 10 receives the command request signal, it reissues the write command WD which it has recently issued. Immediately after the channel adapter 21a receives the write command WD, it transfers an operation end signal to the channel device 10. The channel adapter 21a then reports the end of access to the resource manager 23. When the resource manager 23 is informed of the end of access, it writes in the exclusive control table that the magnetic disk apparatuses 30a, 30b are not being accessed, thereby ending a series of writing operations.

On the other hand, if record slip is necessary, the channel adapter 21a supplies the first record R0 search ID command to the device adapter 22b so as to instruct the magnetic disk apparatus 30b to execute a search ID operation. However, the search ID is not essential.

When the search ID operation is finished, the channel adapter 21a instructs the device adapter 22b to write the latter portion of the record. When the writing operation is finished, the device adapter 22b reports the end of the writing operation to the channel adapter 21a.

The channel adapter 21a supplies a command request signal to the channel device 10. When the channel device 10 receives the command request signal, it reissues the write command WD which it has recently issued. Immediately after the channel adapter 21a receives the write command WD, it transfers an operation end signal to the channel adapter 10. The channel adapter 21a then reports the end of access to the resource manager 23. When the resource manager 23 is informed of the end of access, it writes in the exclusive control table that the magnetic disk apparatuses 30a, 30b are not being accessed, thereby ending a series of writing operations.

(h) Sector value conversion process

FIGS. 12A and 12B are explanatory views of sector value conversion process when a logical track composed of first and second physical tracks is composed of ten sectors (0 to 9). The first physical track belongs to the first magnetic disk apparatus 30a and the second physical track belongs to the second magnetic disk apparatus 30b.

If it is assumed that eight logical sectors out of the ten logical sectors belong to the first physical track (zone A) and the two logical sectors belong to the second physical track (zone B), as shown in FIG. 12A, the logical sector value $S_L$ is converted into the physical sector value $S_P$ in the following way. If the logical sector value $S_L$ is not more than 7, it belongs to the first physical track, and the physical sector value $S_P$=the logical sector value $S_L$. If the logical sector value $S_L$ is more than 7, it belongs to the second physical track, and the physical sector value $S_P$=(the logical sector value $S_L$-8).

If it is assumed that two logical sectors out of the ten logical sectors belong to the first physical track (zone B) and the eight logical sectors belong to the second physical track (zone A), as shown in FIG. 12B, the logical sector value $S_L$ is converted into the physical sector value $S_P$ in the following way. If the logical sector value $S_L$ is not more than 1, it belongs to the first physical track, and the physical sector value $S_P$=the logical sector value S L If the logical sector value $S_L$ is more than 1, it belongs to the second physical track, and the physical sector value $S_P$=(the logical sector value $S_L$-2).

Figure 13:
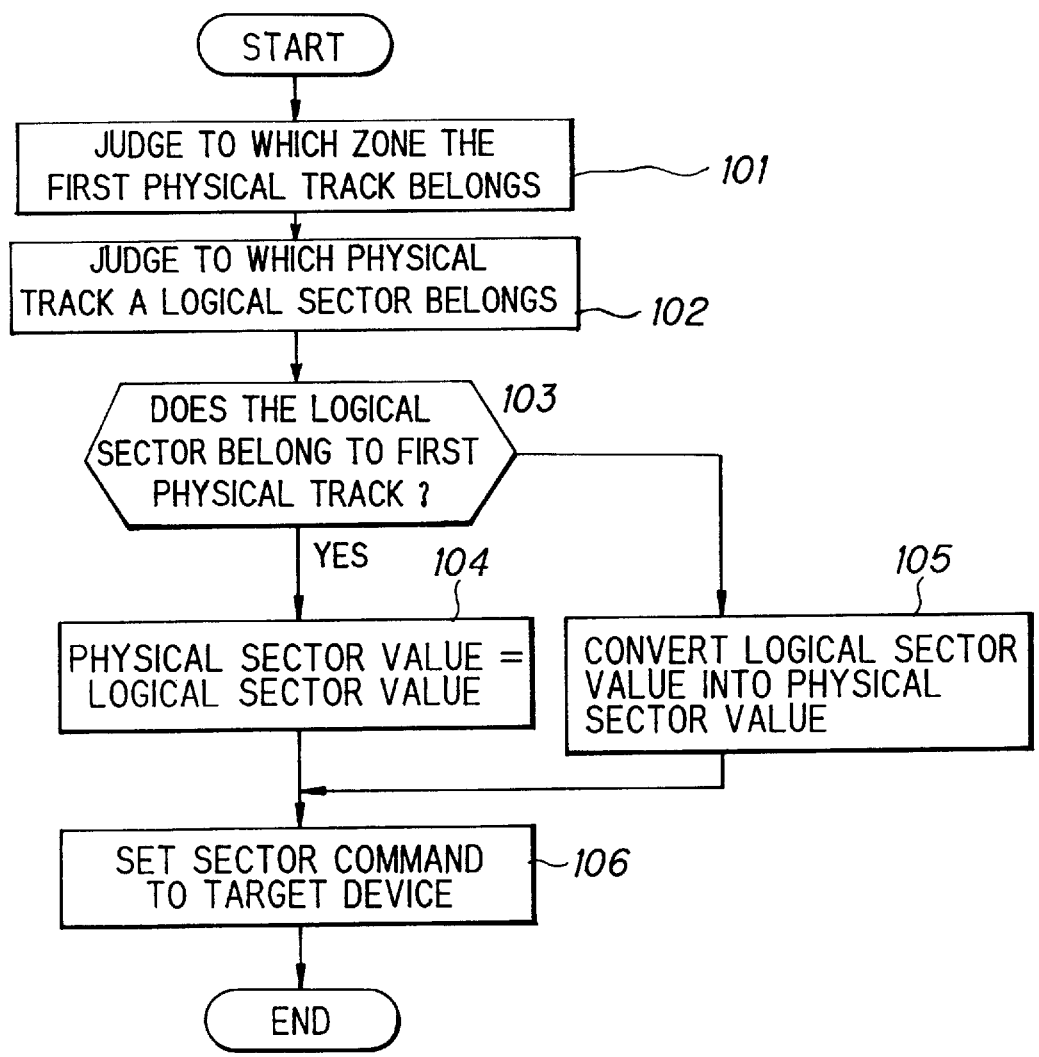
FIG. 13 is a flow chart of a set sector process.

FIG. 13 is a flow chart of a process for converting a logical sector value into a physical sector value. When the positioning operation is finished in response to the seek command, the channel adapter 21a judges to which zone the first physical track belongs by reference to the logical track address containing in the seek command (step 101). The channel adapter 21a then judges to which physical track a logical sector belongs on the basis of the zone to which the first physical track belongs and the logical sector value (step 102).

If the logical sector belongs to the first physical track, the logical sector value is used as the physical sector value of the first physical track as it is ($S_P=S_L$, steps 103, 104). On the other hand, if the logical sector belongs to the second physical track, the logical sector value $S_L$ is converted into the physical sector value $S_P$ of the second physical track in accordance with the zone to which the first physical track belongs, from the following formulas:

$$S_P = S_L - 8$$

... when the first physical track belongs to the zone A $$S_P = S_L - 2$$

... when the first physical track belongs to the zone B (steps 103, 105).

(i) Record split process

Figure 14:
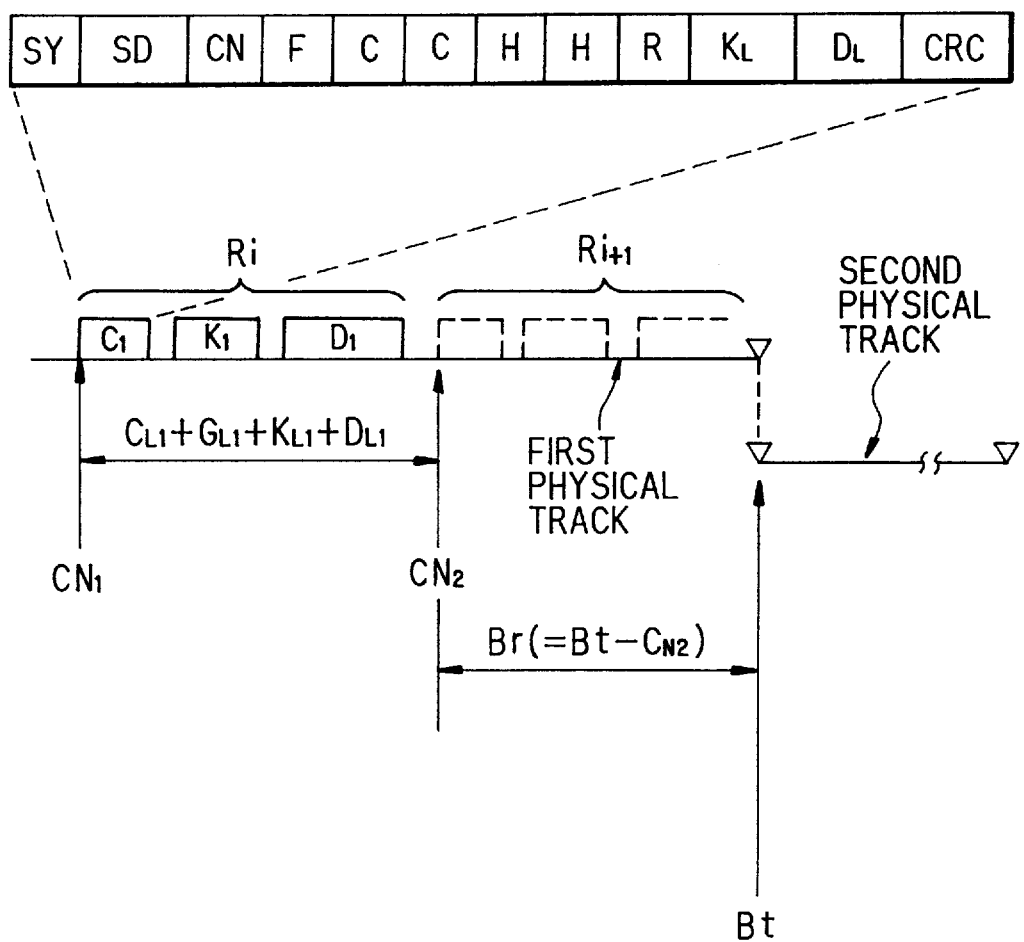
FIG. 14 is an explanatory view of record split processing.
Figure 15:
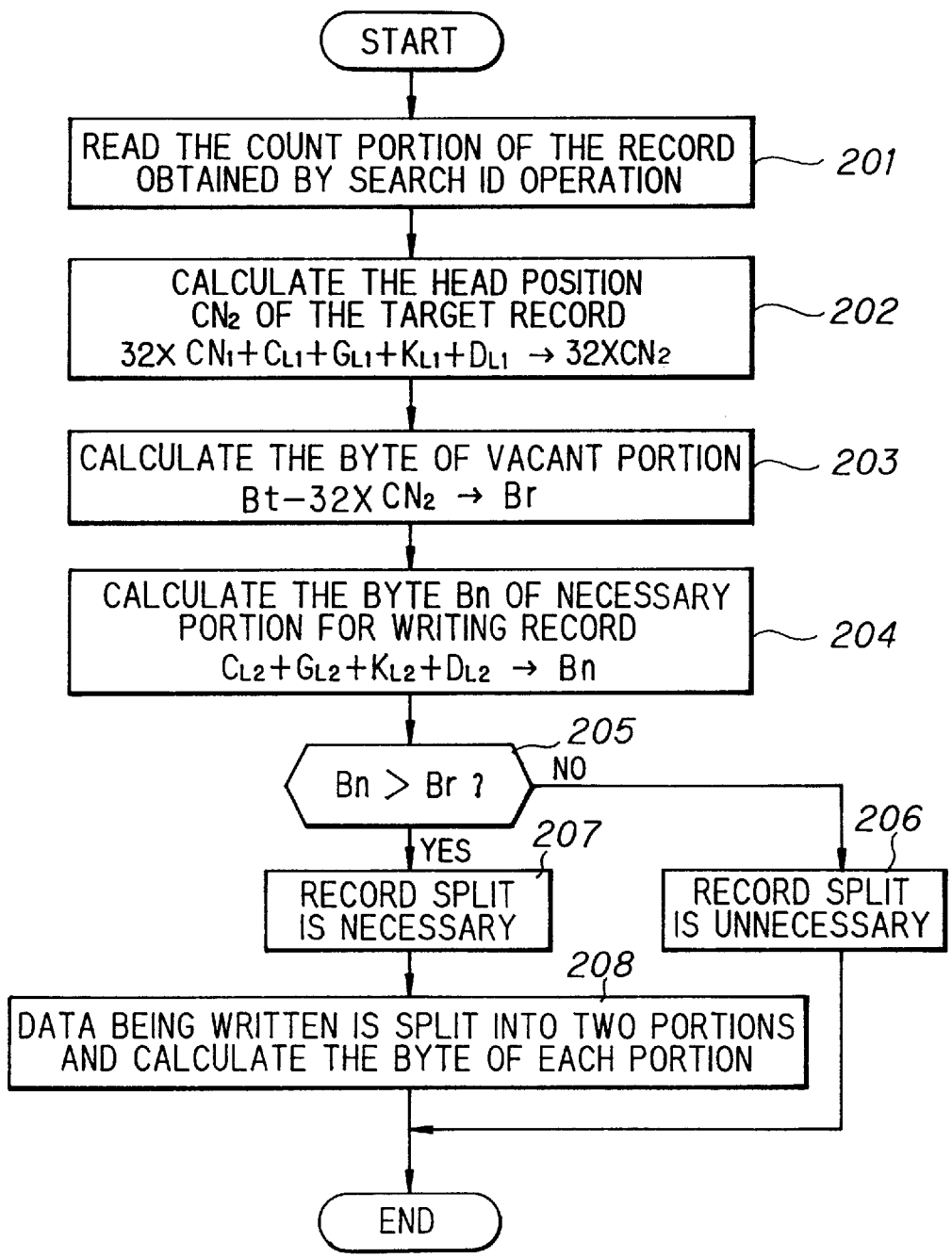
FIG. 15 is a flow chart of a record split process.

FIG. 14 is an explanatory view of a process for determining whether or not record split is necessary and determining the bytes of each split portion when the record is split, and FIG. 15 is a flow chart of a record split process.

In variable-length recording using a CKD format, synchronization data SY, skip defect data SD, cell number CN, flag F for showing the presence or absence of a defect, track address CCHH, record number R, data length $K_L$ of a key portion, data length $D_L$ of a data portion and cyclic redundancy check code CCR are recorded in the count portion of each record. The cell number CN indicates the number of cell at the head of a record when a-track is divided into a plurality of cells, the size of each cell is, for example, 32 bytes.

Therefore, if a record $R_i$ is obtained, it is possible to calculate the head position of the next record by using the contents of the count portion of the record $R_i$. For example, if it is assumed that the cell number of the record $R_i$ is $CN_1$, the length of the count portion is $C_{L1}$, the gap length is $G_{L1}$, the length of the key portion is $K_{L1}$ and the length of the data portion is $D_{L1}$, the position $C_{N2}$ of the subsequent record $R_{i+1}$ is calculated from the following formula (1):

$$32 \times CN_2 = 32 \times CN_1 + C_{L1} + G_{L1} + K_{L1} + D_{L1} \text{ [Bytes]} \quad (1)$$

If it is assumed that the capacity of the first physical track is Bt (bytes), the bytes Br of the vacant portion of the first physical track are calculated from the following formula (2):

$$Br = Bt - 32 \times CN_2 [Bytes] \quad (2).$$

After the search ID operation, the count portion of the record $R_i$ obtained by the search operation is read (step 201), and the head position of the record $R_{i+1}$ as the object of writing is calculated from the formula (1) (step 202). The bytes Br of the vacant portion of the first physical track are calculated from the formula (2) (step 203).

The bytes Bn of the portion necessary for writing the record $R_{i+1}$ are then calculated from the following formula (3):

$$B_n = 32 \times CL_2 + G_{L2} + K_{L2} + D_{L2} \text{ [Bytes]} \quad (3),$$

wherein $CL_2$ is the length (constant) of the count portion, $GL_2$ is the gap length (constant), $K_{L2}$ is the length of the key portion of the record $R_{i+1}$, and $D_{L2}$ is the length of the data portion of the record $R_{i+1}$.

If the bytes Bn are obtained, the bytes Br of the vacant portion are compared with the bytes Bn of the portion necessary for writing the record $R_{i+1}$ (step 205). If $B_n \leq Br$, record split is judged to be unnecessary (step 206), and the record $R_{i+1}$ is written into the first physical track in accordance with the process explained in FIG. 11.

On the other hand, if $B_n > Br$ at the step 205, record split is judged to be necessary (step 207), and the record $R_{i+1}$ is split in to the former portion of Br bytes and the latter portion of (Bn-Br) bytes (step 208). The former portion and the latter portion of the record $R_{i+1}$ are then written into the first physical track and the second physical track, respectively, in accordance with the process explained in FIG. 11.

(j) Data reading control

Data reading control is similar to data writing control. However, it is necessary to judge whether or not the record as the object of reading is split in the following manner. The count portion of the target record is first read, and the cell number $CN_2$ recorded in the count portion is obtained. Bytes Br of the portion from the $CN_2$ to the end of the first physical track are then obtained from the formula (2). The whole bytes Bn of the target record are then calculated from the formula (3) by using the length $K_{L2}$ of the key portion and the length $D_{L2}$ of the data portion recorded in the count portion. When the whole bytes Bn are obtained, the whole bytes Bn are compared with the bytes Br of the portion from the $CN_2$ to the end of the first physical track. If $Bn \leq Br$, it is judged that the target record is not split, and if $Bn > Br$, it is judged that the target record is split.

(k) Modification (k-1) Simultaneous writing control

In the above explanation, when a record is split, the former portion is first written in the first physical track of the first magnetic disk apparatus and then the latter portion is written in the second physical track of the second magnetic disk apparatus. In this case, since the spindle motor of each magnetic disk apparatus is rotated synchronously, it is possible to write data in the second physical track immediately after the end of data writing in the first physical track, thereby enabling high-speed writing.

If the spindle motor of each magnetic disk apparatus is not rotated synchronously, high-speed writing is realized by simultaneously writing data into the first and second magnetic disk apparatuses.

Figure 16:
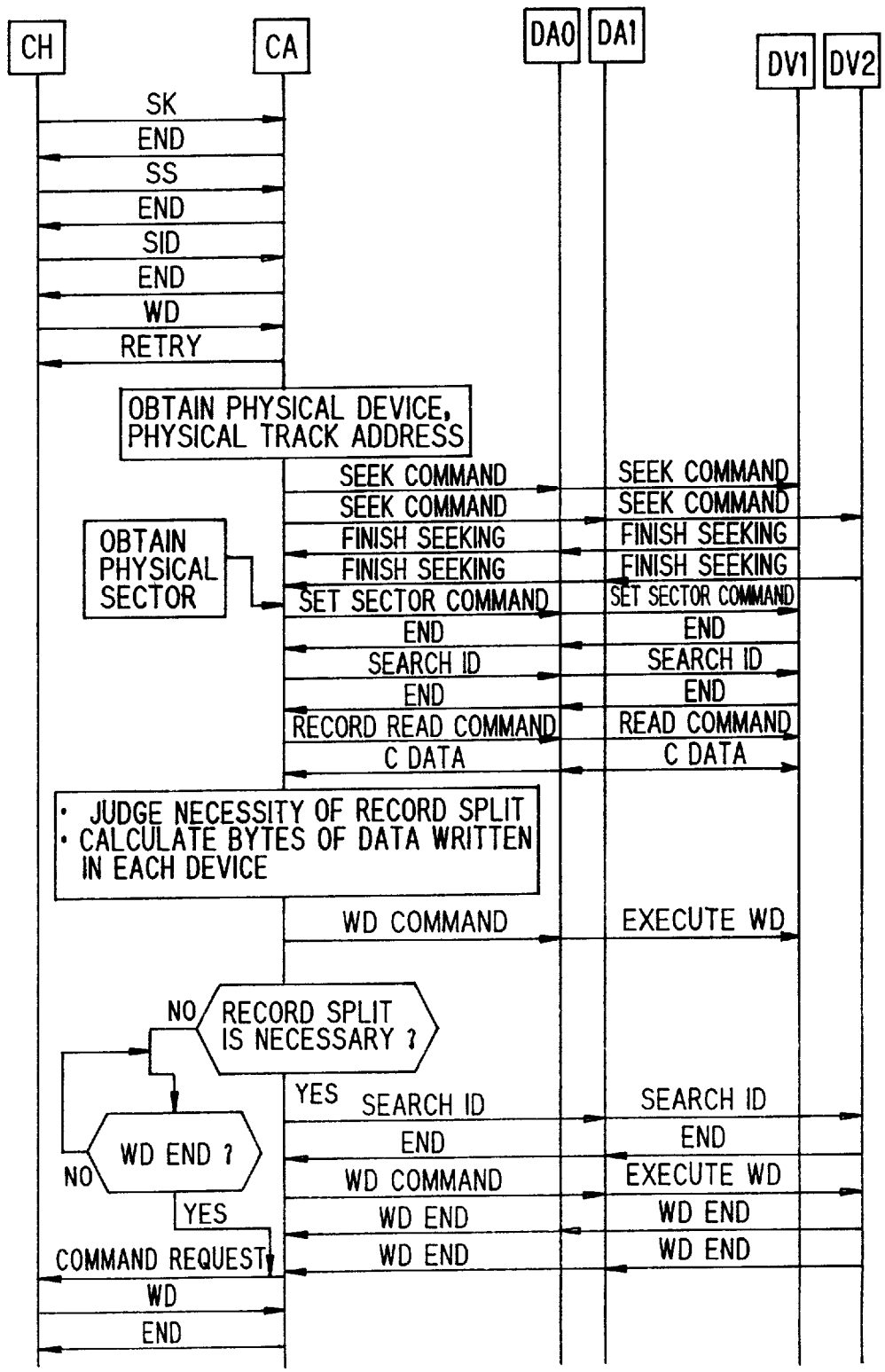
FIG. 16 is an explanatory view of a sequence for simultaneous writing operation.

FIG. 16 is an explanatory view of a sequence of such a simultaneous writing operation. This sequence is different from that shown in FIG. 11 in the following points. In FIG. 11, the channel adapter 21a instructs the second magnetic disk apparatus 30b to execute a search ID operation after the end of data writing into the first magnetic disk apparatus 30a (first physical track), and when the search ID operation is finished, the channel adapter 21a begins a writing operation to the second magnetic disk apparatus 30b. In the sequence shown in FIG. 16, however, during the operation of writing data into the first magnetic disk apparatus 30a, the channel adapter 21a instructs the second magnetic disk apparatus 30b to execute a search ID operation, and when the search ID operation is finished, the channel adapter 21a begins a writing operation to the second magnetic disk apparatus 30b. In this manner, data are simultaneously written into the first and second magnetic disk apparatuses 30a, 30b. When both writing operations are finished, the channel adapter 21a supplies a command request signal to the channel device 10.

(k-2) Erase control after format writing

In variable-length recording system based on a CKD format, the contents of the count portion C is not changed and the key portion K or the data portion D is only rewrited at the time of data rewriting when the record length is not different. However, at the time of the format writing in which the record length is different, the content of the count portion C is also rewrited. To change the content of the count portion C means that the length of the new record is different from the length of the original record which is stored. Consequently, the record stored at the track portions subsequent to the new record is invalid and rather may cause an error in reading. To prevent this, in the case of the format writing, the track portion which follows the new record is erased to the end.

This applies to the present invention in which one logical track is composed of a plurality of physical tracks (e.g., first and second physical tracks), and it is necessary after format writing of a new record to erase the logical track portion which follows the new record. However, the home address information HA and the record R0 are formatted in advance at the head of each physical track. If the logical track after the format writing of a new record is simply erased, the home address information HA and the record R0 of the second physical track are also erased.

Figure 17:
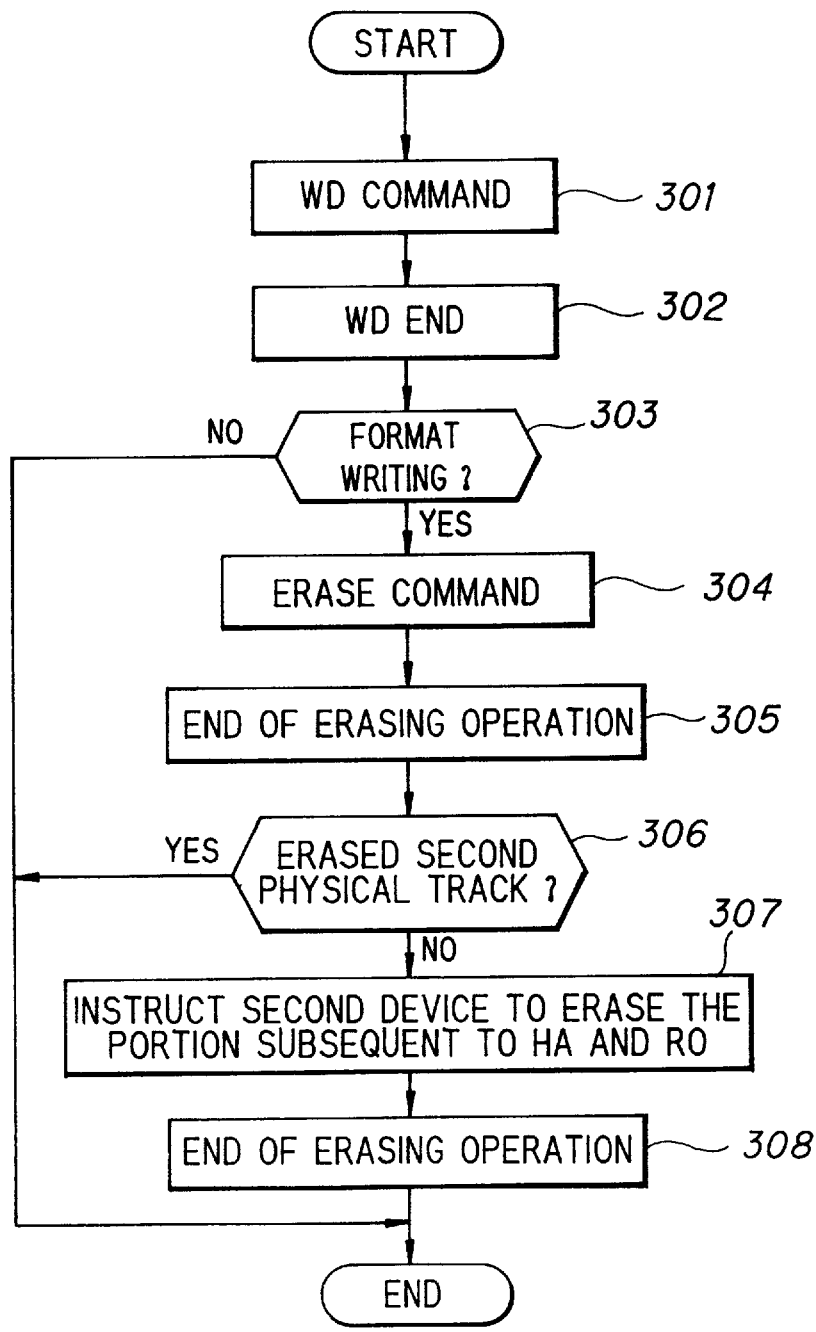
FIG. 17 is a flow chart of an erase process after formatting.

In the present invention, the home address information HA and the record R0 of each physical track are prevented from being erased. FIG. 17 is a flow chart of an erase process after formatting.

The channel adapters 21a and 21b instruct the magnetic disk apparatuses 30a to 30d to write data via the device adapters 22a and 22b, and if the writing operations are finished, each of the channel adapters 21a and 21b judges whether or not the format writing is executed (steps 301 to 303). If the format writing is executed, the processing is finished without the need for an erasing operation.

If the format writing is executed, the channel adapter 21a (21b) instructs the magnetic disk apparatus which has written the last portion of the record to erase the subsequent portion of the physical track (steps 304, 305). When the erasing operation is finished, judgement is made as to whether or not it is the second physical track that has been erased (step 306), and if the answer is YES, the erasing process is finished. On the other hand if the first physical track has been finished, the channel adapter 21a (21b) instructs the second magnetic disk apparatus to erase the portion of the physical track subsequent to HA and R0 (steps 307, 308).

(k-3) Sequential access control

The access to a magnetic disk apparatus in the order of records is called sequential access, and it is possible to judge whether or not access is sequential access by tracing the commands from the channel device.

While sequential access is executed, since it is possible to predict the number of the next record, after the end of access to the current record, the next record is read in advance and stored in the buffer 25. When a read command is issued, the channel adapter 21a judges whether or not the record is stored in the buffer 25, and if the answer is in the affirmative, the record is transferred to the channel device 10, thereby finishing the reading operation. That is, high-speed reading is possible.

Figure 18:
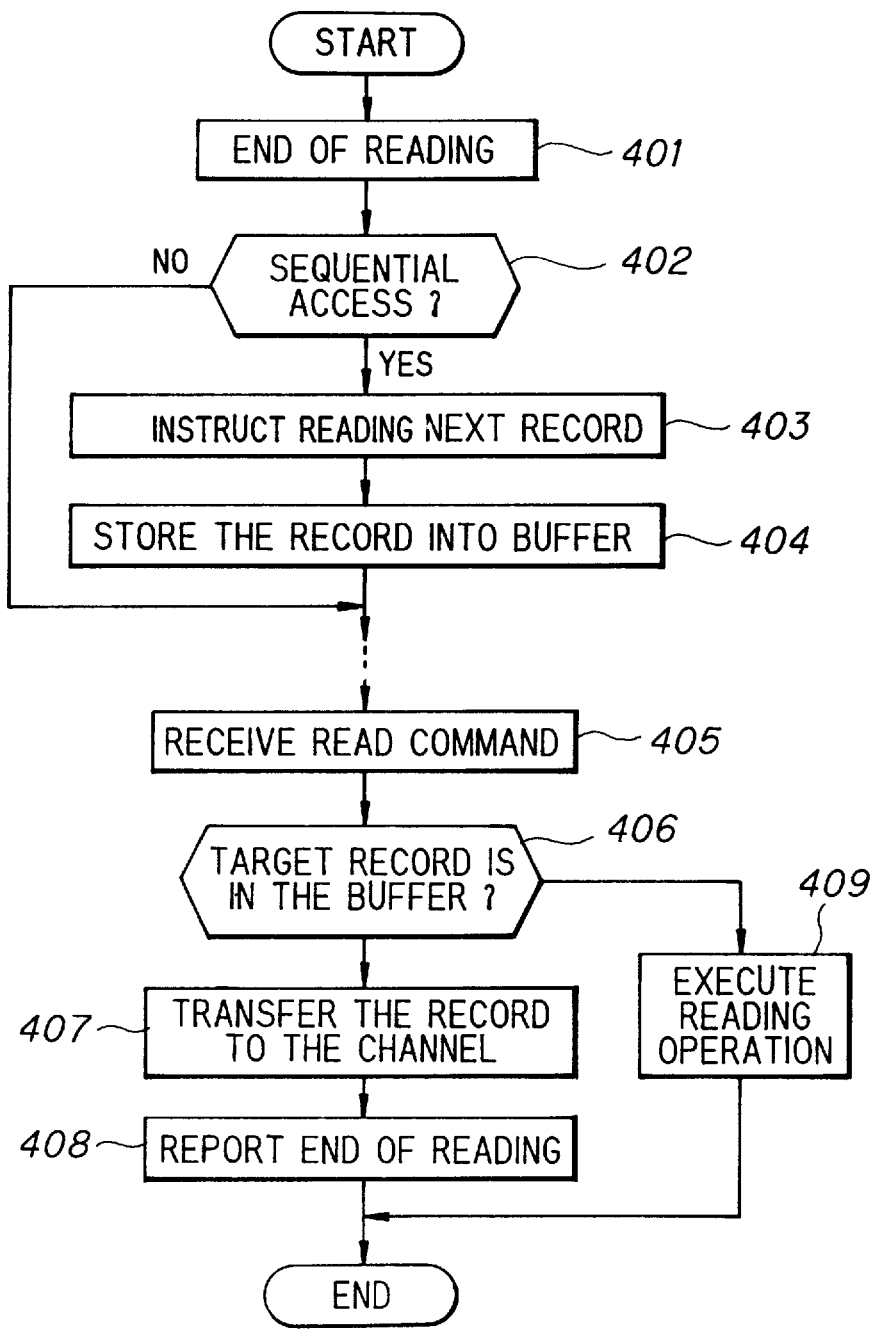
FIG. 18 is a flow chart of sequential access control.
Figure 19:
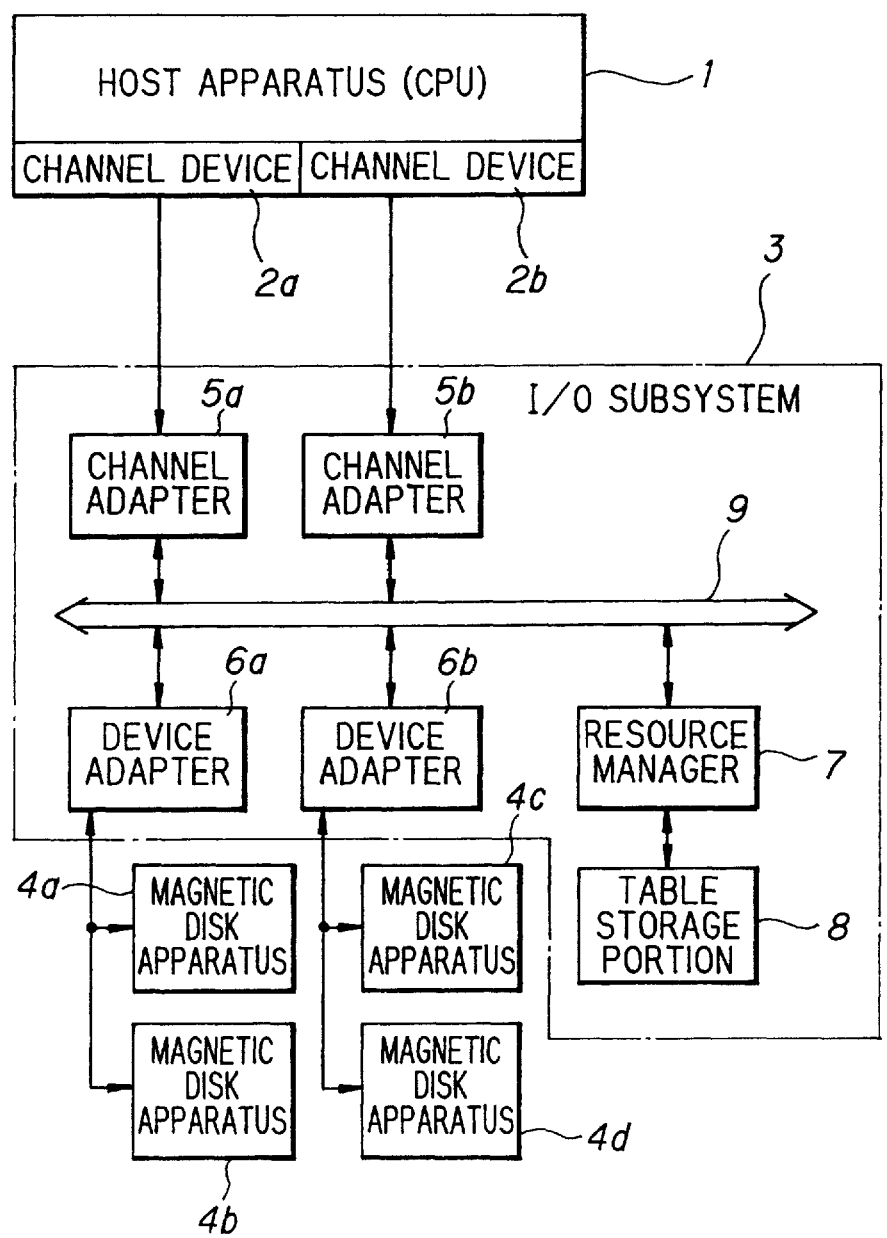
FIG. 19 shows the structure of a general I/O subsystem.
Figure 20:
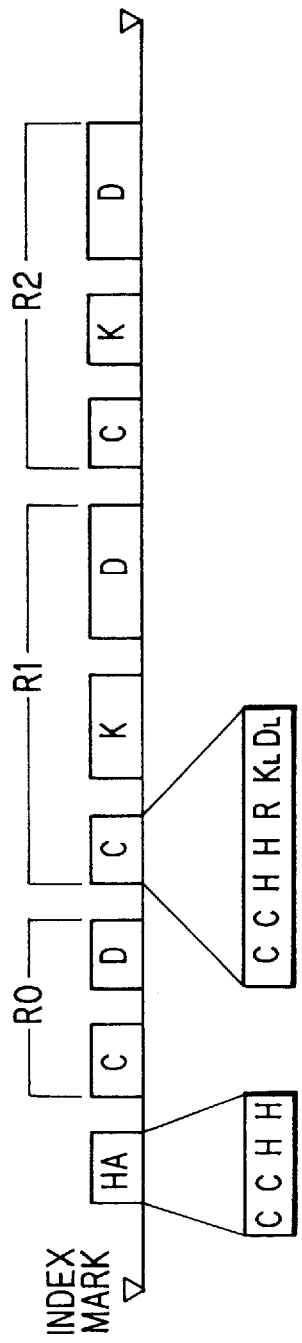
FIG. 20 is an explanatory view of a CKD format.
Figure 21:
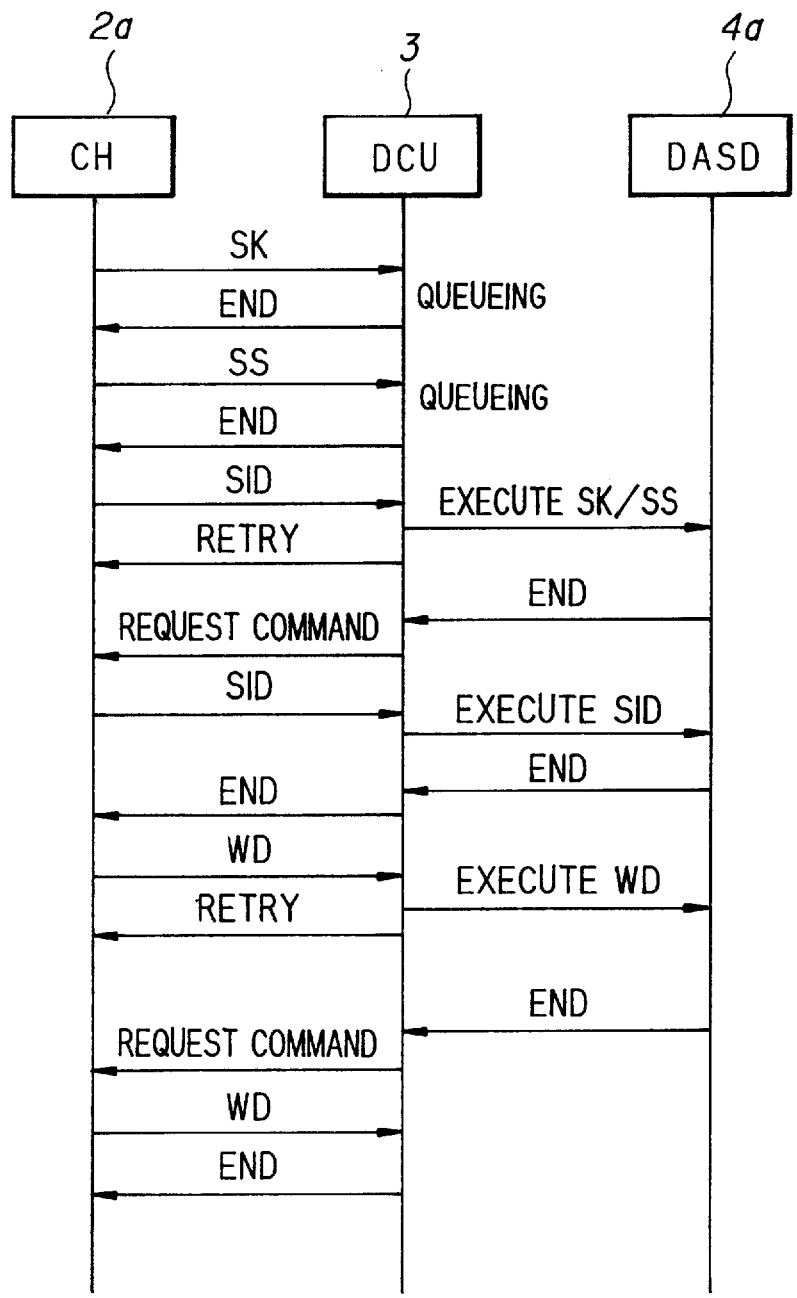
FIG. 21 is an explanatory view of a sequence for a data writing operation.
Figure 22:
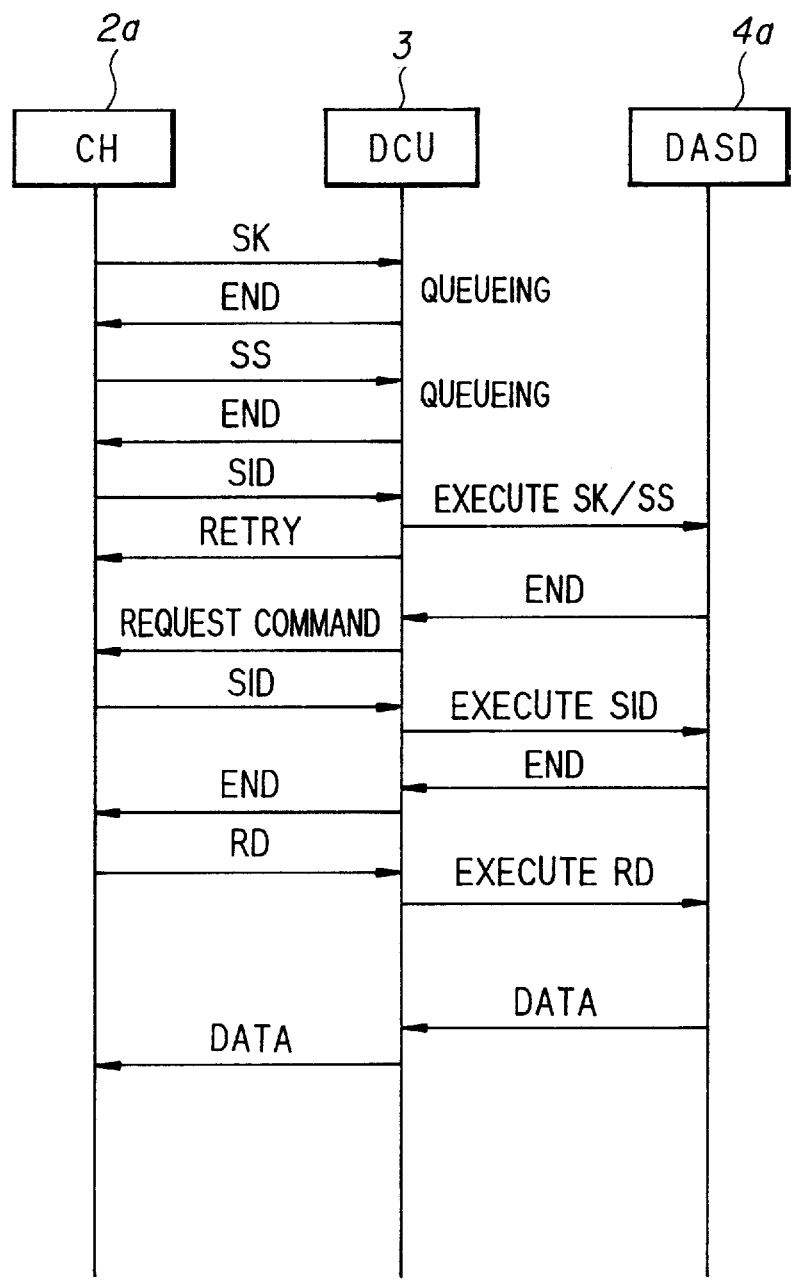
FIG. 22 is an explanatory view of a sequence for a data reading operation.
Figures 23, 24:
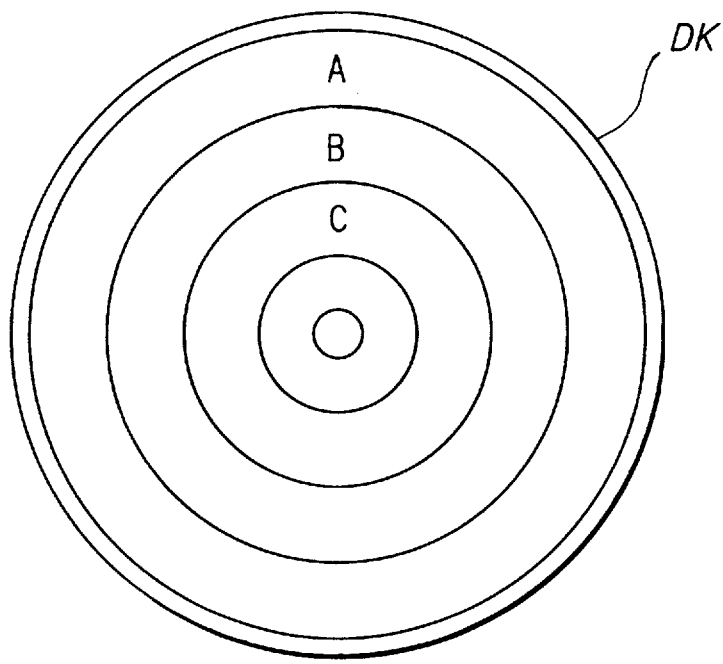
FIG. 23 is an explanatory view of a CDR system.
FIG. 24 is an explanatory view of a track capacity in each zone.

FIG. 18 is a flow chart of sequential access control.

When access (reading operation) is finished (step 401), the channel adapter 21a judges whether or not the access is sequential access (step 402), and if the answer is YES, the channel adapter 21a instructs the magnetic disk apparatuses 30a, 30b to read the next record via the device adapters 22a, 22b (step 403), and stores the read record into the buffer 25 (step 404).

When the channel adapter 21a receives the next read command (step 405), the channel adapter 21a judges whether or not the target record exists in the buffer 25 (step 406), and if the answer is YES, the channel adapter 21a transfers the record to the channel device 10 and reports the end of reading to the channel device 10 (steps 407, 408)

On the other hand, if the target record is not in the buffer 25 at the step 406, the channel adapter 21a reads the record in accordance with the process shown in FIG. 11 and transfers the record to the channel device 10 (step 409).

(k-4) Other features

When a large trouble is caused in a track, that the track is defective is written in the flag region of the home address region HA, and a substitute track address CCHH is written in the count portion of the record R0. Ordinarily a track in the same device is allotted as the substitute track. However, in the present invention in which a logical track is composed of a plurality of physical tracks in different magnetic disk apparatuses, a physical track of another magnetic disk apparatus which constitutes the logical track is allocated as a substitute track. In this manner, the logical track position is prevented from becoming discontinuous.

When a device is inspected, it is possible to shorten the inspection time by simultaneously and individually reading/writing all the magnetic disks to which the physical tracks constituting a logical track belong.

When a logical device becomes defective and it is replaced, the data in the logical device are copied for the respective physical devices which constitute the logical device and only a defective physical device is replaced.

In the case of record split, the count portion of the record is copied in the data portion of the record R0 of the second physical device. In this way, since the count portion of the record is written both in the first physical track and in the second physical track, it is possible to initiate track processing if there is only the information on the second physical device.

As explained above, according to the present invention, since each of logical tracks having the same length is composed of combinations of physical tracks in a plurality of disks and the host apparatus outputs a read/write command by using the logical track address, it is possible to apply variable-length recording system based on a conventional CKD format to a CDR disk apparatus and, in addition, to utilize conventional software resources as they are.

According to the present invention, since a logical track is produced by combining physical tracks in different magnetic disk apparatuses and a logical device is composed of physical devices to which the physical tracks belong, it is possible to equalize the number of heads and the number of cylinders of the logical device to the number of heads and the number of cylinders of each magnetic disk apparatus.

In addition, according to the present invention, when a logical track is produced by combining physical tracks in different magnetic disk apparatuses, since the spindle motor of each magnetic disk apparatus is synchronously rotated, it is possible to write or read a record continuously when the record is read from or written into two physical tracks. That is, high-speed access is enabled.

According to the present invention, when it is necessary to read/write a record from/into a plurality of physical tracks, it is possible to read/write the record from/into the plurality of disks simultaneously and in parallel with each other. Thus, high-speed access is enabled.

Furthermore, according to the present invention, at the time of format writing of a record having a variable length in accordance with a CKD format, it is possible to erase the logical track portion subsequent to the written record except for the home address information HA and the first record R0 recorded at the head of a physical track. It is therefore possible to store the home address information HA and the first record R0 formatted at the head of a physical track in advance.

While sequential access for accessing in the order or records is executed, the next record is read after the end of the access and stored in the buffer in advance, high-speed access is enabled.

As many apparently widely different embodiments of the present invention can be made without departing from the spirit and scope thereof, it is to be understood that the invention is not limited to the specific embodiments thereof except as defined in the appended claims.

What is claimed is:

1. A disk controlling method for a disk controlling apparatus in which a data recording region of a disk is divided in a radial direction into a plurality of zones and a recording frequency is increased in conformity to the distance of a zone from the center of said data recording region so as to limit a data recording density in each zone to a predetermined range, so that an outer zone is provided with a larger track capacity than a middle zone and an inner zone, comprising the steps of:

connecting a first disk apparatus and a second disk apparatus to the disk controlling apparatus wherein the data recording region of each disk includes at least said inner zone, said middle zone and said outer zone;

producing a plurality of first logical tracks by combining physical tracks in the outer zone of the first disk apparatus and physical tracks in the inner zone of the second disk apparatus, producing a plurality of second logical tracks by combining physical tracks in the middle zone of the first disk apparatus and physical tracks in the middle zone of the second disk apparatus and producing a plurality of third logical tracks by combining physical tracks in the inner zone of the first disk apparatus and physical tracks in the outer zone of the second disk apparatus;

converting a logical track address input from a higher-order apparatus at the time of access into a physical track address of the first disk apparatus and a physical track address of the second disk apparatus; and accessing the first and second disk apparatuses on the basis of said physical track addresses obtained by the conversion.

2. A disk controlling method according to claim 1, further comprising the steps of:

judging whether or not there is a sufficient vacant portion for writing a record, in a first physical track obtained by said conversion of logical track addresses;

writing said record in said first physical track if there is a sufficient vacant portion;

splitting said record into former and latter portions if there is not a sufficient vacant portion;

writing said former portion of said record in said first physical track; and writing said latter portion of said record which remains unwritten, in a second physical track obtained by said conversion of logical track addresses.

3. A disk controlling method according to claim 1, further comprising the steps of:

judging whether or not the entire part of a record to be read exists in a first physical track which is obtained by the conversion;

reading said record from said first physical track if the answer is in the affirmative; and reading said record from said first physical track and a second physical track if the answer is in the negative.

4. A disk controlling method according to claim 1, further comprising the step of:

rotating spindle motors for rotating disks of said plurality of disk apparatuses in synchronism with each other.

5. A disk controlling method according to claim 1, further comprising the steps of:

dividing said logical tracks into a plurality of logical sectors which are distinguished from each other by sector values;

when a set sector command having a logical sector value is issued from said higher-order apparatus, converting said logical sector value into a physical sector value of a predetermined physical track which constitutes said logical track; and executing a set sector operation on said physical track.

6. A disk controlling method according to claim 1, further comprising the step of:

executing reading/writing processing with respect to said first and second disk apparatuses simultaneously when it is necessary to read/write a record from/into said plurality of physical tracks.

7. A disk controlling method according to claim 1, further comprising the step of:

writing home address information and a first record R0 in advance in the CKD format at the head of each physical track;

writing a record having a variable length which is formatted in accordance with the CKD format in a predetermined physical track obtained by said conversion of logical track addresses when a format write command is issued from the higher-order apparatus; and erasing the portion of said logical tracks subsequent to said record except for said home address information and said first record R0 recorded at the head of said physical tracks.

8. A disk controlling method according to claim 7, further comprising the steps of:

judging whether or not sequential access for accessing said records in the order of records is executed; and after completion of the access for an object record, reading a record next to the object record in advance and storing the read record into a buffer if the answer is in the affirmative.

9. A disk controlling method for a disk controlling apparatus in which a data recording region of a disk is divided in a radial direction into a plurality of zones and a recording frequency is increased in conformity to the distance of a zone from the center of said data recording region so as to limit a data recording density in each zone to a predetermined range, so that an outer zone is provided with a larger track capacity than a middle zone and an inner zone, comprising the steps of:

producing a plurality of logical tracks by combining physical tracks in a plurality of physical disk apparatuses constituting said logical device, so that each produced logical track has a substantially constant capacity;

said logical tracks including a plurality of first logical tracks having physical tracks in the outer zone of a first disk apparatus and physical tracks in the inner zone of a second disk apparatus a plurality of second logical tracks having physical tracks in the middle zone of the first disk apparatus and physical tracks in the middle zone of the second disk apparatus and a plurality of third logical tracks having physical tracks in the inner zone of the first disk apparatus and physical tracks in the outer zone of the second disk apparatus;

storing in advance the correspondence of said logical device addresses with said physical device addresses in said plurality of disk apparatuses;

obtaining physical device addresses from said correspondence when a logical device address is designated from a higher-order apparatus at the time of access;

converting a logical track address which is designated from said higher-order apparatus at the time of access into physical track addresses of a plurality of disk apparatuses which are designated by said physical device addresses; and accessing said disks.

10. The method of claim 9 further comprising the step of:

rotating spindle motors for rotating disks of said plurality of physical disk apparatuses in synchronism with each other.

11. A disk controlling apparatus in which a data recording region of a disk is divided in a radial direction into a plurality of zones, and a recording frequency is increased in conformity to the distance of a zone from the center of said data recording region so as to limit a data recording density in each zone to a predetermined range, so that an outer zone is provided with a larger track capacity than a middle zone and an inner zone comprising:

means for connecting a first disk apparatus and a second disk apparatus to the disk controlling apparatus wherein the data recording region of each disk is divided into at least said inner zone said middle zone and said outer zone:

means for producing a plurality of first logical tracks by combining physical tracks in the outer zone of the first disk apparatus and physical tracks in the inner zone of the second disk apparatus, producing a plurality of second logical tracks by combining physical tracks in the middle zone of the first disk apparatus and physical tracks in the middle zone of the second disk apparatus, and producing a plurality of third logical tracks by combining physical tracks in the inner zone of the first disk apparatus and physical tracks in the outer zone of the second disk apparatus;

a device address converting means for converting a logical device address which is input from a higher-order apparatus into a physical device address of the first disk apparatus and a physical device address of the second disk apparatus;

a track address converting means for converting a logical track address input from said higher-order apparatus into a physical track address of the first disk apparatus and a physical track address of the second disk apparatus; and a control means for controlling said disk apparatuses so that said physical tracks obtained by the conversion are accessed.

12. A disk controlling apparatus according to claim 11, further comprising:

a means for judging whether or not there is a sufficient vacant portion for writing a record, in a first physical track obtained by said track address converting means at the time of writing said record, and judging whether or not the entire part of a record to be read exists in said first physical track which is obtained by said track address converting means at the time of reading;

wherein said control means writes said record in said first physical track if there is a sufficient vacant portion, while writing the portion of said record which remains unwritten in a second physical track obtained by said track address converting means if there is not a sufficient vacant portion, at the time of writing said record, and reads said record from said first physical track if said record to be read exists on said first physical track, while reading said record from said first physical track and a second physical track if said record to be read exists both in said first physical track and in said second physical track, at the time of reading said record.

13. A disk controlling method for a disk controlling apparatus in which a data recording region of a disk is divided in a radial direction into a plurality of zones and a recording frequency is increased in conformity to the distance of a zone from the center of said data recording region so as to limit a data recording density in each zone to a predetermined range, so that an outer zone is provided with a larger track capacity than an inner zone, comprising the steps of:

producing at least one logical track by combining a plurality of physical tracks in a plurality of disk apparatuses;

dividing said logical track into a plurality of logical sectors which are distinguished from each other by sector values;

when a set sector command having a logical sector value is issued from said higher-order apparatus, converting said logical sector value into a physical sector value of a predetermined physical track which constitutes said logical track; and accessing said disk on the basis of the physical track addresses obtained by the conversion, by executing a set sector operation on said physical track.

14. A disk controlling method for a disk controlling apparatus in which a data recording region of a disk is divided in a radial direction into a plurality of zones and a recording frequency is increased in conformity to the distance of a zone from the center of said data recording region so as to limit a data recording density in each zone to a predetermined range, so that an outer zone is provided with a larger track capacity than an inner zone, comprising the steps of:

producing at least one logical track by combining a plurality of physical tracks in a plurality of disk apparatuses;

writing home address information and a first record R0 in a CKD format at the head of each physical track;

converting a record having a variable length which is formatted in accordance with the CKD format in a predetermined physical track when a format write command is issued from the higher-order apparatus; and erasing the portion of said logical track subsequent to said record except for said home address information and said first record R0 recorded at the head of a physical track.

* * * * *